(12) United States Patent
Neumeier et al.

(10) Patent No.: US 9,094,714 B2
(45) Date of Patent: Jul. 28, 2015

(54) SYSTEMS AND METHODS FOR ON-SCREEN GRAPHICS DETECTION

(71) Applicants: Zeev Neumeier, Berkeley, CA (US); Michael Collette, San Rafael, CA (US)

(72) Inventors: Zeev Neumeier, Berkeley, CA (US); Michael Collette, San Rafael, CA (US)

(73) Assignee: Cognitive Networks, Inc., San Francisco, CA (US)

( * ) Notice: Subject to any disclaimer, the term of this patent is extended or adjusted under 35 U.S.C. 154(b) by 0 days.

(21) Appl. No.: 14/217,375

(22) Filed: Mar. 17, 2014

(65) Prior Publication Data

US 2014/0201773 A1 Jul. 17, 2014

Related U.S. Application Data

(63) Continuation-in-part of application No. 14/089,003, filed on Nov. 25, 2013, now Pat. No. 8,898,714, and a continuation-in-part of application No. 12/788,721, filed on May 27, 2010, now Pat. No. 8,595,781, and a (Continued)

(51) Int. Cl.
| | |
|---|---|
| H04H 60/32 | (2008.01) |
| H04H 60/29 | (2008.01) |
| H04N 21/44 | (2011.01) |
| H04N 21/442 | (2011.01) |
| H04N 5/445 | (2011.01) |
| H04N 21/45 | (2011.01) |
| H04N 21/466 | (2011.01) |
| H04N 21/478 | (2011.01) |

(52) U.S. Cl.
CPC ..... *H04N 21/44008* (2013.01); *H04N 5/44591* (2013.01); *H04N 21/44204* (2013.01); *H04N 21/4532* (2013.01); *H04N 21/4667* (2013.01); *H04N 21/478* (2013.01)

(58) Field of Classification Search
CPC ............. H04N 21/44; H04N 21/44008; G06T 7/0083; G06T 7/0085; G06T 7/0081
USPC ........... 725/19, 20, 32, 22; 382/190, 195, 199
See application file for complete search history.

(56) References Cited

U.S. PATENT DOCUMENTS

| | | | | |
|---|---|---|---|---|
| 4,739,398 | A * | 4/1988 | Thomas et al. | 725/22 |
| 5,826,165 | A * | 10/1998 | Echeita et al. | 725/22 |
| 6,008,802 | A * | 12/1999 | Iki et al. | 715/721 |
| 7,039,930 | B1 * | 5/2006 | Goodman et al. | 725/22 |

(Continued)

OTHER PUBLICATIONS

Santos et al., "Real-Time Opaque and Semi-Transparent TV Logos Detection", Proceedings of the 5th Annual International Information and Telecommunication Technologies Symposium, Dec. 6, 2006.*

*Primary Examiner* — James R Sheleheda
(74) *Attorney, Agent, or Firm* — Puget Patent; Michael Gibbons

(57) ABSTRACT

A system and method is disclosed for detecting locally-generated or other unknown graphics that are superimposed on a video program displayed on a television receiver or other like device. Devices external to a television receiver, such as a cable or satellite set-top box, can generate logos, electronic program guides, or other images that are then graphically overlaid on the television signal emanating from the device to the television's display. The system and method described herein provides a means to detect the presence of such on-screen graphics both to detect and identify graphical information and to also enable automated resolution of any interference among or between a plurality of video graphic subsystems.

42 Claims, 18 Drawing Sheets

Related U.S. Application Data continuation-in-part of application No. 12/788,748, filed on May 27, 2010, now Pat. No. 8,769,584, and a continuation-in-part of application No. 14/217,039, filed on Mar. 17, 2014, now Pat. No. 9,055,335, and a continuation-in-part of application No. 14/217,075, filed on Mar. 17, 2014, now Pat. No. 9,055,309, and a continuation-in-part of application No. 14/217,094, filed on Mar. 17, 2014, now Pat. No. 8,930,980, and a continuation-in-part of application No. 14/217,425, filed on Mar. 17, 2014, and a continuation-in-part of application No. 14/217,435, filed on Mar. 17, 2014.

(60) Provisional application No. 61/791,578, filed on Mar. 15, 2013, provisional application No. 61/290,714, filed on Dec. 29, 2009, provisional application No. 61/182,334, filed on May 29, 2009.

(56) References Cited

U.S. PATENT DOCUMENTS

| | | | | |
|---|---|---|---|---|
| 8,175,413 | B1* | 5/2012 | Ioffe et al. | 382/283 |
| 8,625,902 | B2* | 1/2014 | Baheti et al. | 382/190 |
| 2008/0044102 | A1* | 2/2008 | Ekin | 382/276 |
| 2008/0138030 | A1* | 6/2008 | Bryan et al. | 386/52 |
| 2008/0240562 | A1* | 10/2008 | Fukuda et al. | 382/173 |
| 2010/0166257 | A1* | 7/2010 | Wredenhagen | 382/103 |
| 2011/0299770 | A1* | 12/2011 | Vaddadi et al. | 382/165 |
| 2012/0177249 | A1* | 7/2012 | Levy et al. | 382/103 |
| 2014/0270489 | A1* | 9/2014 | Lim et al. | 382/159 |
| 2014/0270504 | A1* | 9/2014 | Baum et al. | 382/165 |
| 2014/0270505 | A1* | 9/2014 | McCarthy | 382/165 |
| 2014/0282671 | A1* | 9/2014 | McMillan | 725/19 |

* cited by examiner

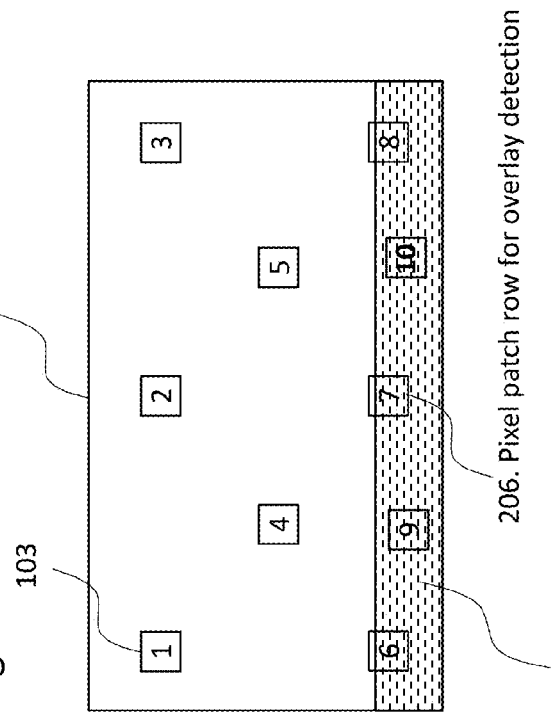

Fig. 2

- 101
- 103
- 205. Typical set-top overlay graphic area
- 206. Pixel patch row for overlay detection

[Test for locally generated overlay bar:
6, 7, 8 covert to DCT, look for horizontal edge
6,7,8 sweep up from bottom to 1/3 of screen in search of horz edge (Sharr function, 3x3 matrix)
9, 10 test for non-changing video
ACR change: when edge found, ACR search ignores pixel patches below detected edge]

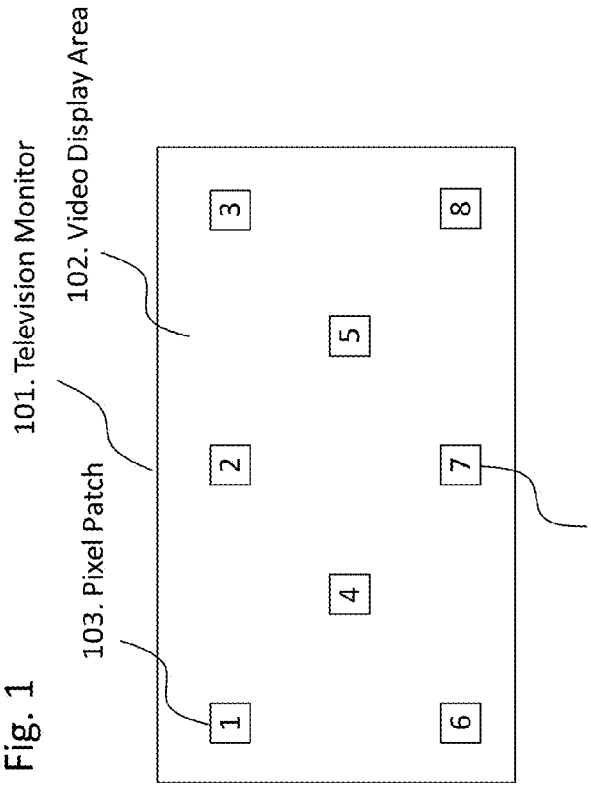

Fig. 1

- 101. Television Monitor
- 102. Video Display Area
- 103. Pixel Patch
- 104. Pixel Patch sample row for overlay detection

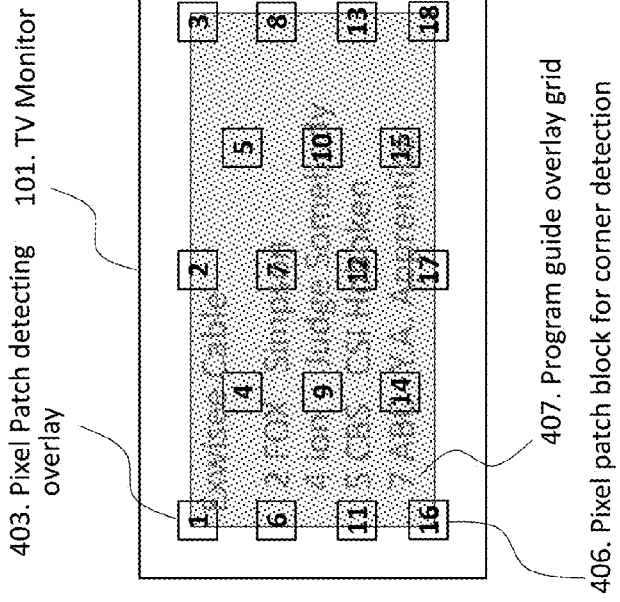

Fig. 4

403. Pixel Patch detecting overlay
101. TV Monitor
407. Program guide overlay grid
406. Pixel patch block for corner detection

[Test for locally generated large overlay panel:
1, 3, 16, 18 convert to DCT, look for corner
2, 17 covert to DCT, look for horz edge
6, 8, 11, 13 convert to DCT, look for vert edge
4, 5, 7, 9, 10, 12, 14, 15 test for non-changing video
ACR change: when edge found, ACR search halts until graphic is removed]

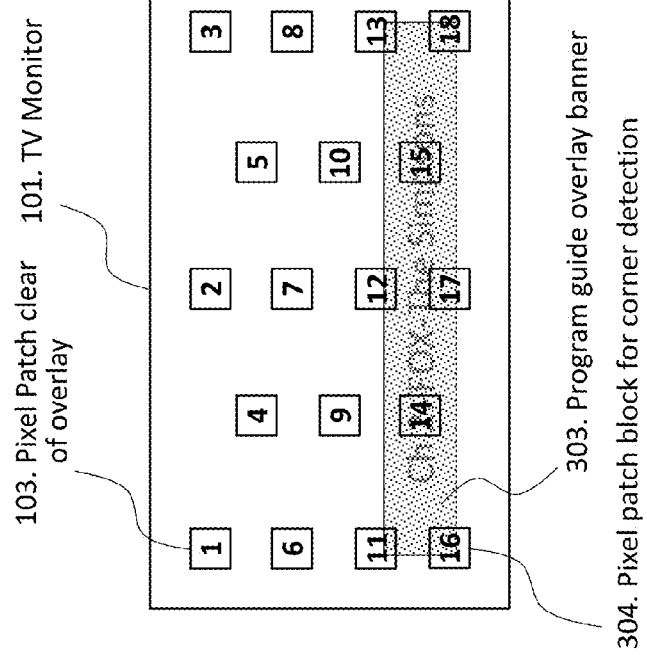

Fig. 3

103. Pixel Patch clear of overlay
101. TV Monitor
303. Program guide overlay banner
304. Pixel patch block for corner detection

[Test for locally generated overlay bar:
11, 13, 16, 18 convert to DCT, look for corner
12, 17 covert to DCT, look for horz edge
14, 15 test for non-changing video
ACR change: when edge found, ACR search ignores pixel patches below detected top edge]

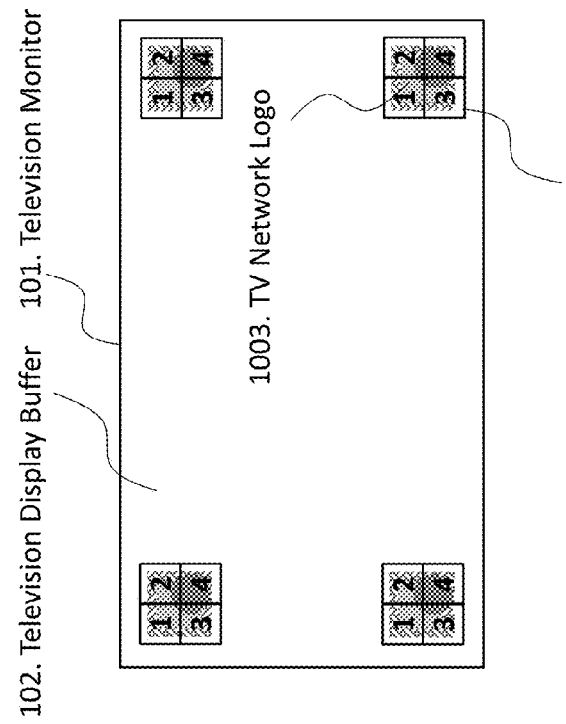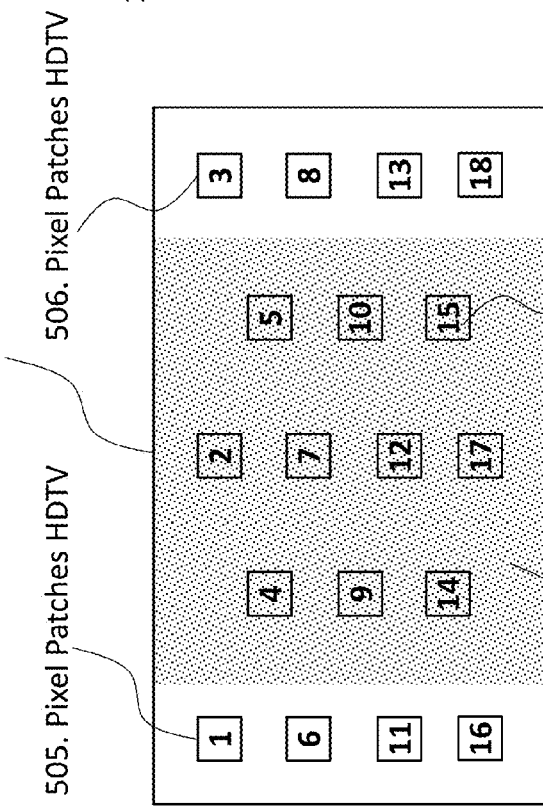

601. Video Frame Converted to Grayscale

701. Video Frame Filtered for Horizontal Edges

702. Horizontal line Revealed

703. Horizontal Line Filter Equation $$G_y = \begin{bmatrix} -3 & -10 & -3 \\ 0 & 0 & 0 \\ 3 & 10 & 3 \end{bmatrix} * I$$

Fig. 12 DCT zig-zag matrix indicating high frequency content (e.g. possible edge)

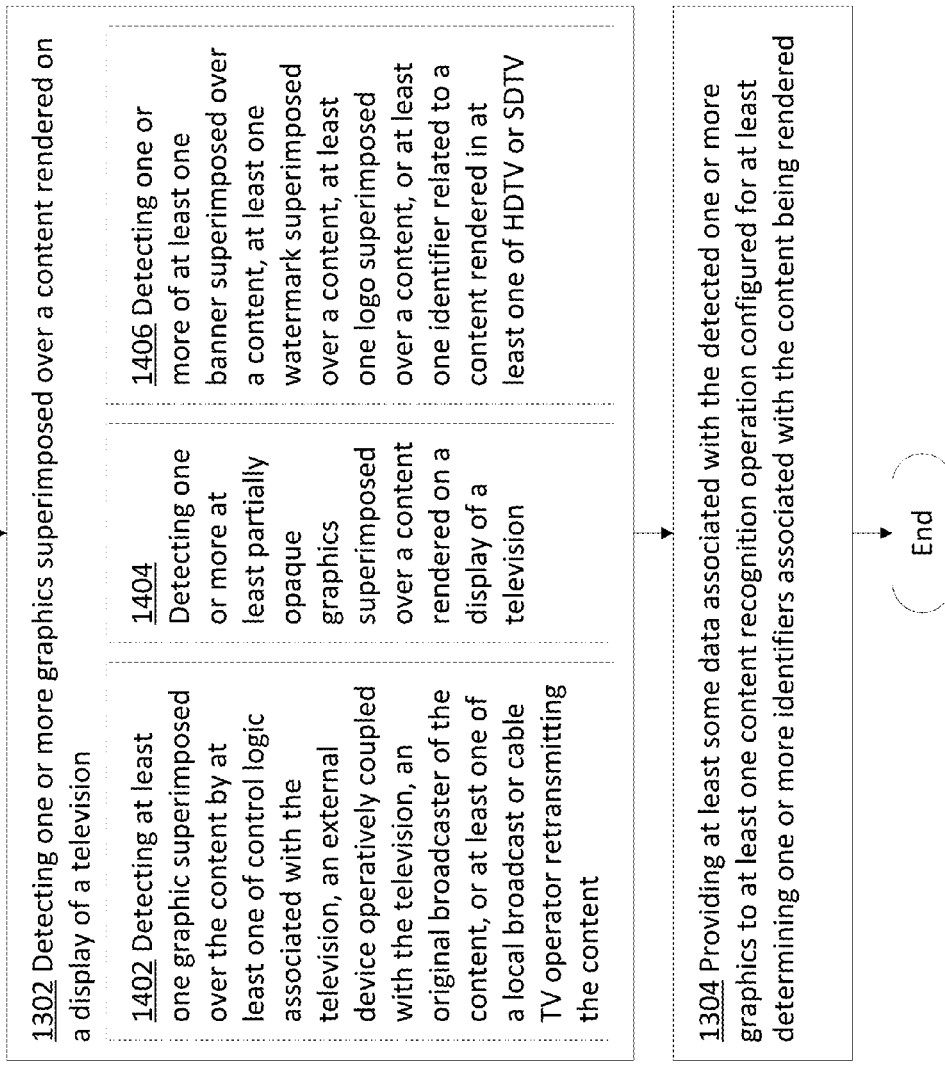

1702 Storing the content rendered on the display in one or more buffers

1704 Removing color data associated with the content from the one or more buffers 1706 Performing at least one Gaussian blur operation on the data in the one or more buffers 1708 Transforming data associated with the one or more pixel patch locations and the one or more buffers to identify one or more high-contrast regions of pixel patches, the one or more high-contrast regions at least partially determinative of one or more of at least one horizontal edge, at least one vertical edge, at least one diagonal edge, or at least one corner associated with the content rendered on the display 1710 Transforming data associated with the one or more pixel patch locations and the one or more buffers using at least one of a discrete cosine transform, a Sobel algorithm, a Sharr algorithm, or another algorithm operable to identify one or more high-contrast regions of pixel patches

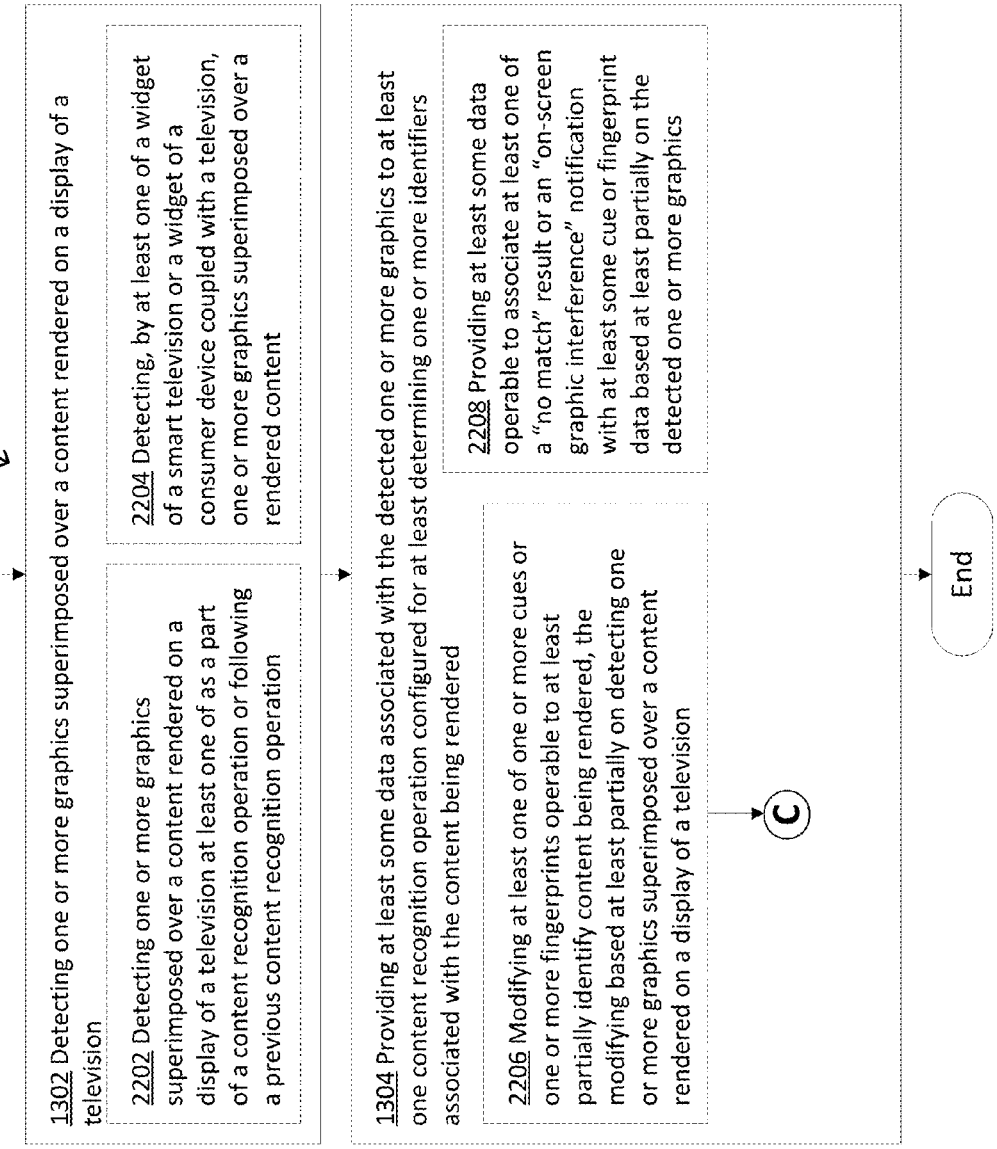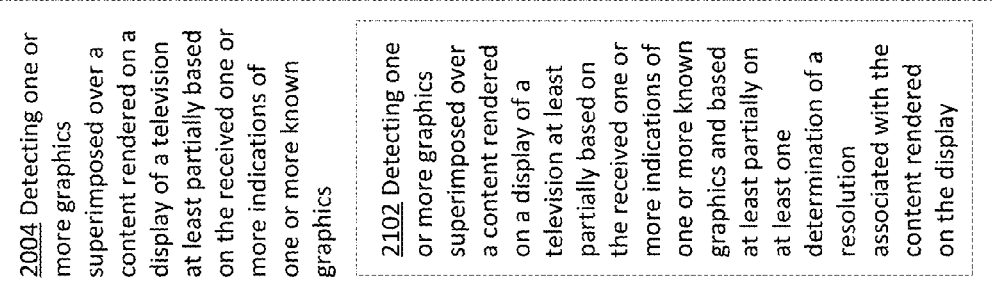

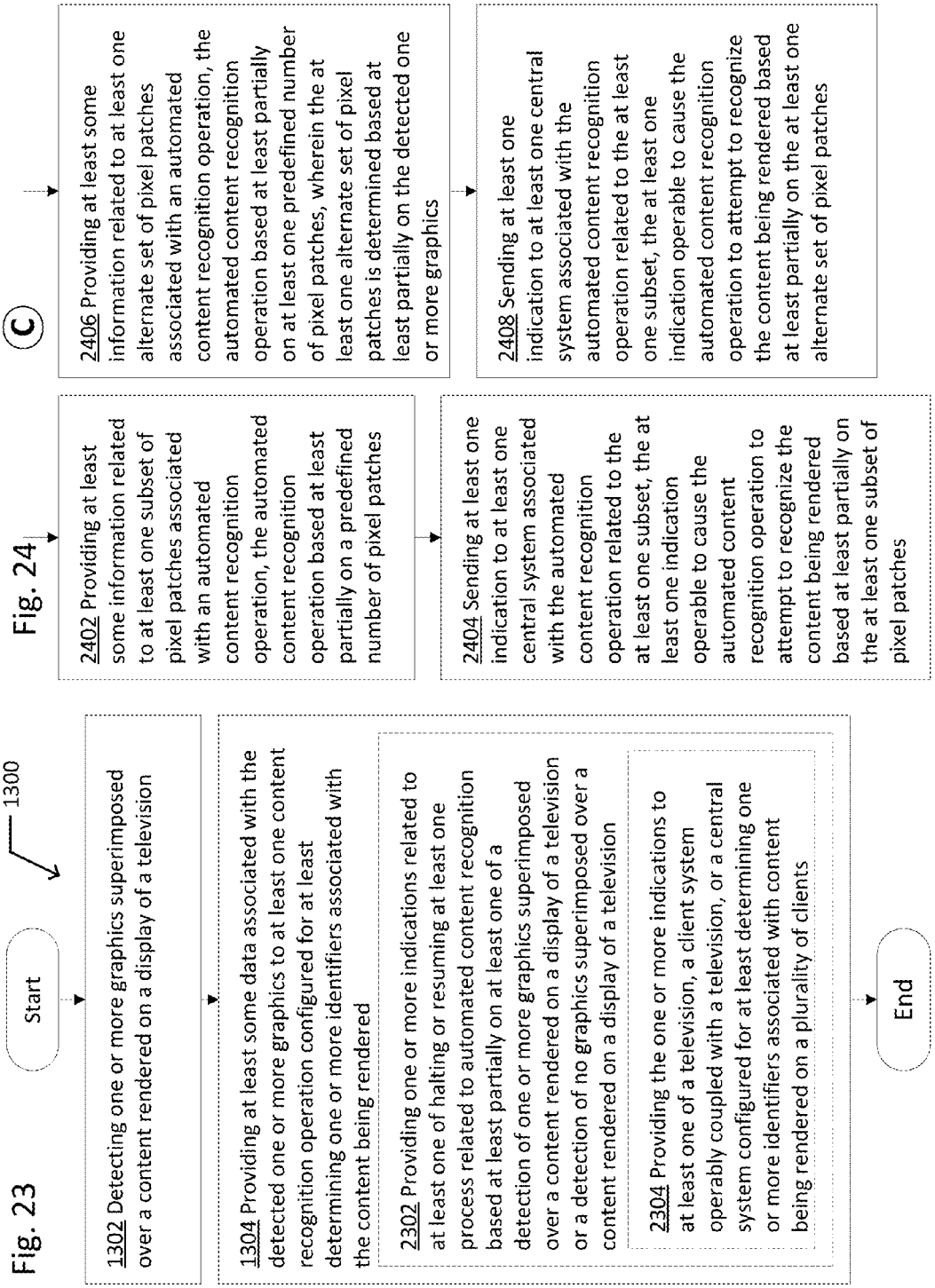

Fig. 25

2500 At least one non-transitory computer-readable medium

2502 One or more instructions for:
(a) detecting one or more graphics superimposed over a content rendered on a display of a television; and
(b) providing at least some data associated with the detected one or more graphics to at least one content recognition operation configured for at least determining one or more identifiers associated with the content being rendered

Fig. 26

2600 A system

2602 Circuitry configured for detecting one or more graphics superimposed over a content rendered on a display of a television 2604 Circuitry configured for providing at least some data associated with one or more detected graphics to at least one content recognition operation configured for at least determining one or more identifiers associated with content being rendered

SYSTEMS AND METHODS FOR ON-SCREEN GRAPHICS DETECTION

PRIORITY CLAIM

This application constitutes a continuation-in-part of U.S. patent application Ser. No. 12/788,721, entitled "METHODS FOR IDENTIFYING VIDEO SEGMENTS AND DISPLAYING CONTEXTUAL TARGETED CONTENT ON A CONNECTED TELEVISION," filed May 27, 2010, and issued Nov. 6, 2013 as U.S. Pat. No. 8,595,781, that application being a non-provisional application claiming priority from U.S. Provisional Patent Application No. 61/182,334, entitled "SYSTEM FOR PROCESSING CONTENT INFORMATION IN A TELEVIDEO SIGNAL," filed May 29, 2009 and being a non-provisional application claiming priority from U.S. Provisional Patent Application No. 61/290,714, entitled "CONTEXTUAL TARGETING BASED ON DATA RECEIVED FROM A TELEVISION SYSTEM," filed Dec. 29, 2009; this application further constitutes a continuation-in-part of U.S. patent application Ser. No. 12/788,748, entitled "METHODS FOR DISPLAYING CONTEXTUALLY TARGETED CONTENT ON A CONNECTED TELEVISION," filed May 27, 2010; this application further constitutes a continuation-in-part of U.S. patent application Ser. No. 14/089,003, entitled "METHODS FOR IDENTIFYING VIDEO SEGMENTS AND DISPLAYING CONTEXTUALLY TARGETED CONTENT ON A CONNECTED TELEVISION," filed Nov. 25, 2013; this application further constitutes a continuation-in-part of U.S. patent application Ser. No. 14/217,039, entitled "SYSTEMS AND METHODS FOR ADDRESSING A MEDIA DATABASE USING DISTANCE ASSOCIATIVE HASHING," filed Mar. 17, 2014; this application further constitutes a continuation-in-part of U.S. patent application Ser. No. 14/217,075, entitled "SYSTEMS AND METHODS FOR IDENTIFYING VIDEO SEGMENTS FOR DISPLAYING CONTEXTUALLY RELEVANT CONTENT," filed Mar. 17, 2014; this application further constitutes a continuation-in-part of U.S. patent application Ser. No. 14/217,094, entitled "SYSTEMS AND METHODS FOR REAL-TIME TELEVISION AD DETECTION USING AN AUTOMATED CONTENT RECOGNITION DATABASE," filed Mar. 17, 2014; this application further constitutes a continuation-in-part of U.S. patent application Ser. No. 14/217,425, entitled "SYSTEMS AND METHODS FOR IMPROVING SERVER AND CLIENT PERFORMANCE IN FINGERPRINT ACR SYSTEMS," filed Mar. 17, 2014; this application further constitutes a continuation-in-part of U.S. patent application Ser. No. 14/217,435, entitled "SYSTEMS AND METHODS FOR MULTI-BROADCAST DIFFERENTIATION," filed Mar. 17, 2014; and this application further constitutes a non-provisional application of U.S. Provisional Patent Application No. 61/791,578, entitled "SYSTEMS AND METHODS FOR IDENTIFYING VIDEO SEGMENTS BEING DISPLAYED ON REMOTELY LOCATED TELEVISIONS," filed Mar. 15, 2013. The foregoing applications are either currently co-pending or are applications of which a currently co-pending application is entitled to the benefit of the filing date and are hereby incorporated by reference in their entirety as if fully set forth herein.

FIELD OF THE INVENTION

This invention generally relates to image recognition, and more particularly, to systems and methods for on-screen graphics detection.

BACKGROUND

A system and method is disclosed for detecting locally-generated or other unknown graphics that are superimposed on a video program displayed on a television receiver or other like device. Devices external to a television receiver, such as a cable or satellite set-top box, can generate logos, electronic program guides, or other images that are then graphically overlaid on the television signal emanating from the device to the television's display. Likewise, the new generation of smart TV's contain internal processors and graphics display means to display overlaid windows of information generated by smartphone-like applications on said internal processors. Said internal processing can also receive television programming from the Internet and display said programming in place of television program from traditional television broadcasters. Further, local broadcast or cable TV operators can overlay certain graphics or alerts superimposed on the television programming that they carry. In some instances, understanding what the graphics communicate is important such as programmer identification. In other cases, these graphics can result in impairing or disabling the video recognition capability of an automatic content recognition (ACR) system [such as with the invention of U.S. Pat. No. 8,595,781 of which this document is a continuation in part]. The system and method described herein provides a means to detect the presence of such on-screen graphics both to detect and identify graphical information and to also enable automated resolution of any interference among or between a plurality of video graphic sub-systems.

Television broadcast signals have long included static graphics such as logos, program identification, or other information formatted to display superimposed on underlying video programming. Often, these identifiers are small in size, semi-transparent and located in a corner of the display area. A common example is the logo of a broadcast network displayed in typically the lower right corner of a television picture. In recent decades, information about the television programing, such as the network, channel and the name of the program, has been embedded as metadata in the digital television signal and broadcast freely to television receivers. In other cases, television program information has been supplied from third-parties such as Tribune and Rovi as electronic program guides (EPG). This information can be formatted as graphical information for display on television receivers by cable and satellite set-top boxes.

Television sets, set-top boxes, and home computers are now converging into what are sometimes called "Smart TVs." To take advantage of the full potential of this new technology, the computing means within or associated with the television set needs real-time "awareness" of the programing being displayed by it.

Various means to achieve that goal of such content awareness are known to those skilled in the art; including approaches to video fingerprinting that enable a computing means to match what is currently being displayed on the screen of the television to databases of possible candidates. A typical system that possesses this capability is described in U.S. Pat. No. 8,595,781.

However, a difficulty arises when additional, local components (such as a set-top box, game console or other connected devices) generate graphical user interfaces, text messages, or logos that display superimposed on the video programming. This overlaying of graphical elements, such as program information that the user has invoked from a cable or satellite set-top box, cause the video fingerprint recognition means to fail since the fingerprint matching data provided for the algorithm has no awareness of the additional locally-generated graphical screen elements and may return a "no match" result. It is the goal of this invention to enable the video matching sub-system to associate any such "no match" result with an "on-screen graphic interference" notification to enable the video matching system to respond appropriately. It is also a goal of the system operating on the processing means within a television system to signal information to a central content matching system to adjust to the presence of otherwise interfering graphical elements and only attempt to match video samples drawn from around the video display in areas not affected by locally generated graphic elements. It is still a further goal of the invention to identify overlaid graphical elements, such as television channel logos, using the processing means of the smart TV when advantageous to the system.

SUMMARY

In some embodiments, an exemplary method related to on-screen graphics detection may include detecting one or more graphics superimposed over a content rendered on a display of a television; and providing at least some data associated with the detected one or more graphics to at least one content recognition operation configured for at least determining one or more identifiers associated with the content being rendered.

In some embodiments, detecting one or more graphics superimposed on a content rendered on a television display may include detecting at least one graphic superimposed over the content by at least one of control logic associated with the television, an external device operatively coupled with the television, an original broadcaster of the content, or at least one of a local broadcast or cable TV operator retransmitting the content. In some embodiments, detecting one or more graphics superimposed on a content rendered on a television display may include detecting one or more at least partially opaque graphics superimposed over a content rendered on a display of a television. In some embodiments, detecting one or more graphics superimposed on a content rendered on a television display may include detecting one or more of at least one banner superimposed over a content, at least one watermark superimposed over a content, at least one logo superimposed over a content, or at least one identifier related to a content rendered in at least one of HDTV or SDTV.

In some embodiments, detecting one or more graphics superimposed over a content rendered on a display of a television may include detecting one or more of at least some program guide information, at least a portion of a graphical user interface, at least some program identification information, at least some text, or at least some image that is not associated with original program content or underlying video programming.

In some embodiments, detecting one or more graphics superimposed over a content rendered on a display of a television may include detecting one or more high contrast differences between video sections of a content rendered on a display of a television. In some embodiments, detecting one or more graphics superimposed over a content rendered on a display of a television may include detecting one or more graphics superimposed over a content, including at least one identification of one or more of at least one horizontal edge, at least one vertical edge, at least one diagonal edge, or at least one corner associated with the content rendered on the display.

In some embodiments, detecting one or more graphics superimposed over a content, including at least one identification of one or more of at least one horizontal edge, at least one vertical edge, at least one diagonal edge, or at least one corner associated with the content rendered on the display may include determining one or more pixel patch locations and one or more pixel patch sizes corresponding with the one or more pixel patch locations; sampling at least some pixel data associated with the content rendered on the display, the sampling occurring at the one or more determined pixel patch locations; transforming the at least some pixel data sampled from the one or more determined pixel patch locations; and identifying one or more of at least one horizontal edge, at least one vertical edge, at least one diagonal edge, or at least one corner associated with the content rendered on the display based at least partially on at least a portion of the transformed at least some pixel data from at least one sampled pixel patch.

In some embodiments, detecting one or more graphics superimposed over a content, including at least one identification of one or more of at least one horizontal edge, at least one vertical edge, at least one diagonal edge, or at least one corner associated with the content rendered on the display may further include identifying one or more of at least one additional horizontal edge, at least one additional vertical edge, or at least one additional corner based at least partially on at least a portion of the transformed at least some pixel data from at least one other sampled pixel patch. In some embodiments, detecting one or more graphics superimposed over a content, including at least one identification of one or more of at least one horizontal edge, at least one vertical edge, at least one diagonal edge, or at least one corner associated with the content rendered on the display may further include identifying one or more of at least one additional horizontal edge, at least one additional vertical edge, or at least one additional corner based at least partially on one or more stepwise sweep operations, wherein a stepwise sweep operation is configured for examining successive pixel patch locations in at least one of a horizontal or vertical direction starting from a pixel patch location associated with the identified one or more of at least one horizontal edge, at least one vertical edge, or at least one corner.

In some embodiments, sampling at least some pixel data associated with the content rendered on the display, the sampling occurring at the one or more determined pixel patch locations and transforming the at least some pixel data sampled from the one or more determined pixel patch locations may include storing the content rendered on the display in one or more buffers; removing color data associated with the content from the one or more buffers; performing at least one Gaussian blur operation on the data in the one or more buffers; and transforming data associated with the one or more pixel patch locations and the one or more buffers to identify one or more high-contrast regions of pixel patches, the one or more high-contrast regions at least partially determinative of one or more of at least one horizontal edge, at least one vertical edge, at least one diagonal edge, or at least one corner associated with the content rendered on the display.

In some embodiments, transforming data associated with the one or more pixel patch locations and the one or more buffers to identify one or more high-contrast regions of pixel patches, the one or more high-contrast regions at least partially determinative of one or more of at least one horizontal edge, at least one vertical edge, at least one diagonal edge, or at least one corner associated with the content rendered on the display may include transforming data associated with the one or more pixel patch locations and the one or more buffers using at least one of a discrete cosine transform, a Sobel algorithm, a Shan algorithm, or another algorithm operable to identify one or more high-contrast regions of pixel patches.

In some embodiments, determining one or more pixel patch locations and one or more pixel patch sizes corresponding with the one or more pixel patch locations may include determining one or more pixel patch locations and one or more pixel patch sizes corresponding with the one or more pixel patch locations based at least partially on at least one determination of a resolution associated with the content rendered on the display.

In some embodiments, an exemplary computer program product related to on-screen graphics detection may include at least one non-transitory computer-readable medium, and the at least one non-transitory computer-readable medium may include one or more instructions for detecting one or more graphics superimposed over a content rendered on a display of a television; and one or more instructions for providing at least some data associated with the detected one or more graphics to at least one content recognition operation configured for at least determining one or more identifiers associated with the content being rendered.

In some embodiments, an exemplary system related to on-screen graphics detection may include circuitry configured for detecting one or more graphics superimposed over a content rendered on a display of a television; and circuitry configured for providing at least some data associated with one or more detected graphics to at least one content recognition operation configured for at least determining one or more identifiers associated with content being rendered.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 1 illustrates the sampling of the raster of a typical television screen 101 with a number of "pixel patches" 103. As taught by the invention of which this is a continuation in part, the processing means within the television is instructed to sample the video display memory in only certain locations (eight locations are used in this example) and to apply certain algorithmic processes to said pixel patches. The results of said processes are transmitted to a central server means at a programmable rate such as every video frame or every other video frame, etc.

FIG. 2 shows a graphic overlay 205 conveying current program information that is formatted along the bottom edge of the screen so pixel patches in that area will change from the values in the central reference database while overlaid.

FIGS. 3 and 4 illustrate another sampling scheme where a locally-generated banner is detected and sized by finding its corners 304 and looking for what patches remain relatively constant, as compared to normal video of a television program.

FIG. 5 illustrates detecting 508 whether the display is formatted as 507 standard definition or as HDTV, 505 and 506.

FIG. 10 illustrates sampling in the four corners of a video frame to detect an on screen logo 1003 with a pixel patch array 1004.

FIG. 12 shows an example of a DCT macro block encoding a region of 8 by 8 pixels containing high-frequency content which could be an edge or corner of a graphic element.

FIG. 13 illustrates an operational flow representing example operations related to on-screen graphics detection.

FIG. 14 illustrates an alternative embodiment of the operational flow of FIG. 13.

FIG. 17 illustrates an alternative embodiment of the operational flow of FIG. 13.

FIG. 21 illustrates an alternative embodiment of the operational flow of FIG. 13.

FIG. 22 illustrates an alternative embodiment of the operational flow of FIG. 13.

FIG. 23 illustrates an alternative embodiment of the operational flow of FIG. 13.

FIG. 24 illustrates an alternative embodiment of the operational flow of FIG. 13.

FIG. 25 illustrates an exemplary computer program product related to on-screen graphics detection.

FIG. 26 illustrates a system related to on-screen graphics detection.

DETAILED DESCRIPTION

One means of graphic overlay detection is to use an algorithm to find video image edges by detecting high contrast differences between video sections of a television raster. Such algorithmic means are well known to the person skilled in the art. If said transition area remains in an expected locations for longer than a short duration, such as a program information banner overlay, then the likelihood of detecting said banner using the means of this system and method is high.

A "pixel patch" is defined as a block of pixels that are sampled from the raster. For the purposes of graphics overlay detection, such pixel patches might be sized to 32 by 32, or a multiple thereof such as 64 by 64 to take advantage of the discrete cosine transform or DCT. The DCT function can be readily performed internally to the television monitor 101 by the television's internal processor means using the software application of the invention. The sharp edges of a graphic overlay 205 can be detected by examining the coefficients in the lower right quadrant of the DCT transform of each macro block regardless of size chosen.

The detection process could also include detecting over a predetermined length of time unchanging high frequency information from the same DCT transform location to confirm the presence of a graphic overlay. In this manner, the scrolling banners frequently seen in news programs would not trigger the overlay detection as the moving text of the banner would be readily detected by the changing DCT coefficients.

Likewise, a method can be employed using algorithms such as Sobel and Sharr or using similar means as taught by the open-source perceptual hashing family of image analysis. As with the DCT method above, these algorithmic means also can be used to detect edges, as well as corners, of graphical objects within video signals. Similar to each of these said means, an odd dimensioned matrix such as 3×3 pixels is used in a convolution-coded stepwise sweep over a video area of interest to search for edges.

Figure 6:
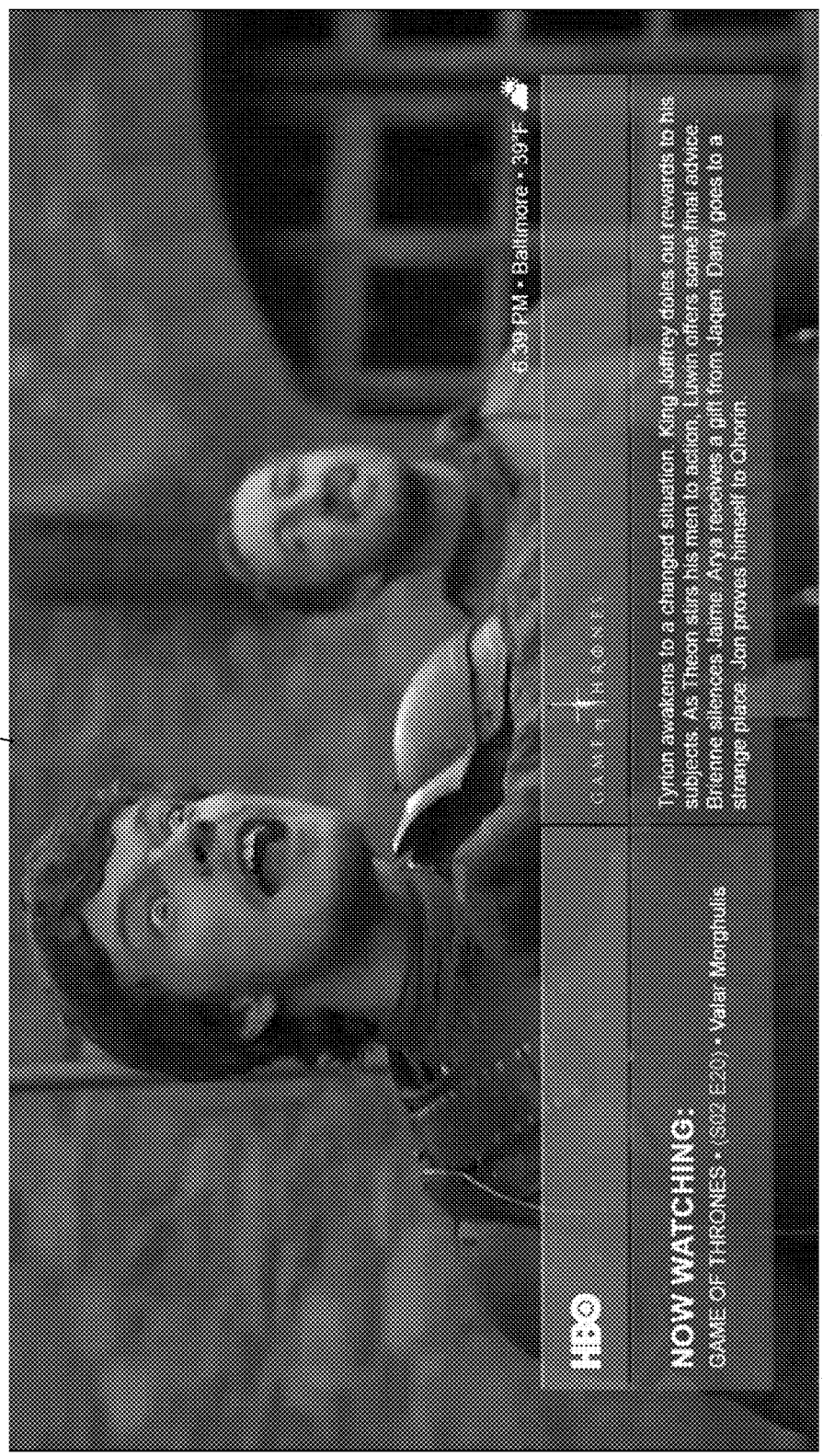
FIG. 6 shows an example video frame showing television programming overlaid with an information banner.
Figure 7:
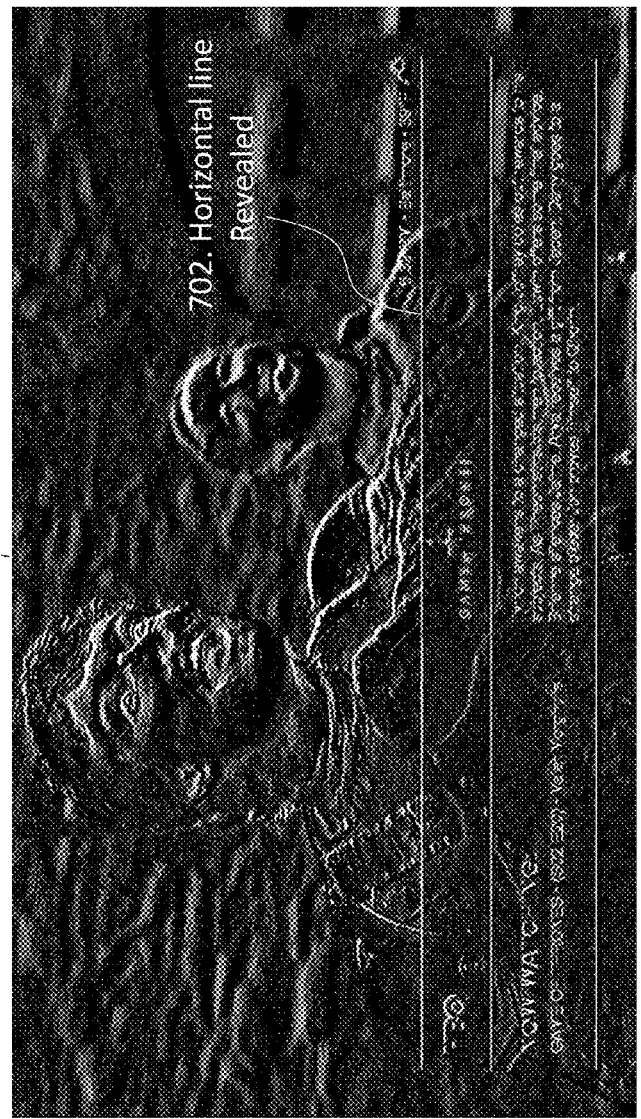
FIG. 7 shows an example video frame after processing with filter equation 703 to reveal horizontal boundaries.
Figure 8:
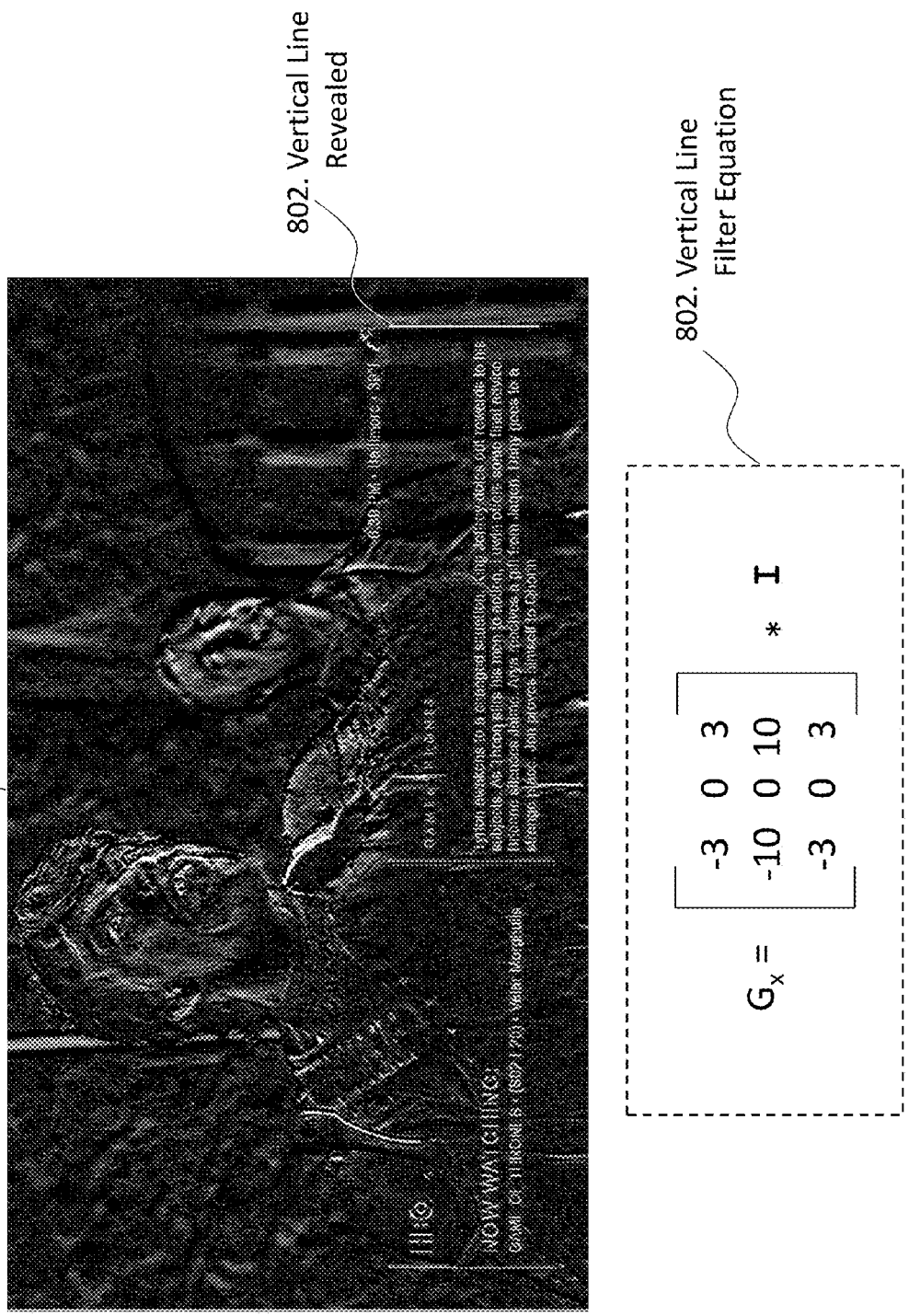
FIG. 8 shows an example video frame after processing with filter equation 803 to reveal vertical boundaries.
Figure 9:
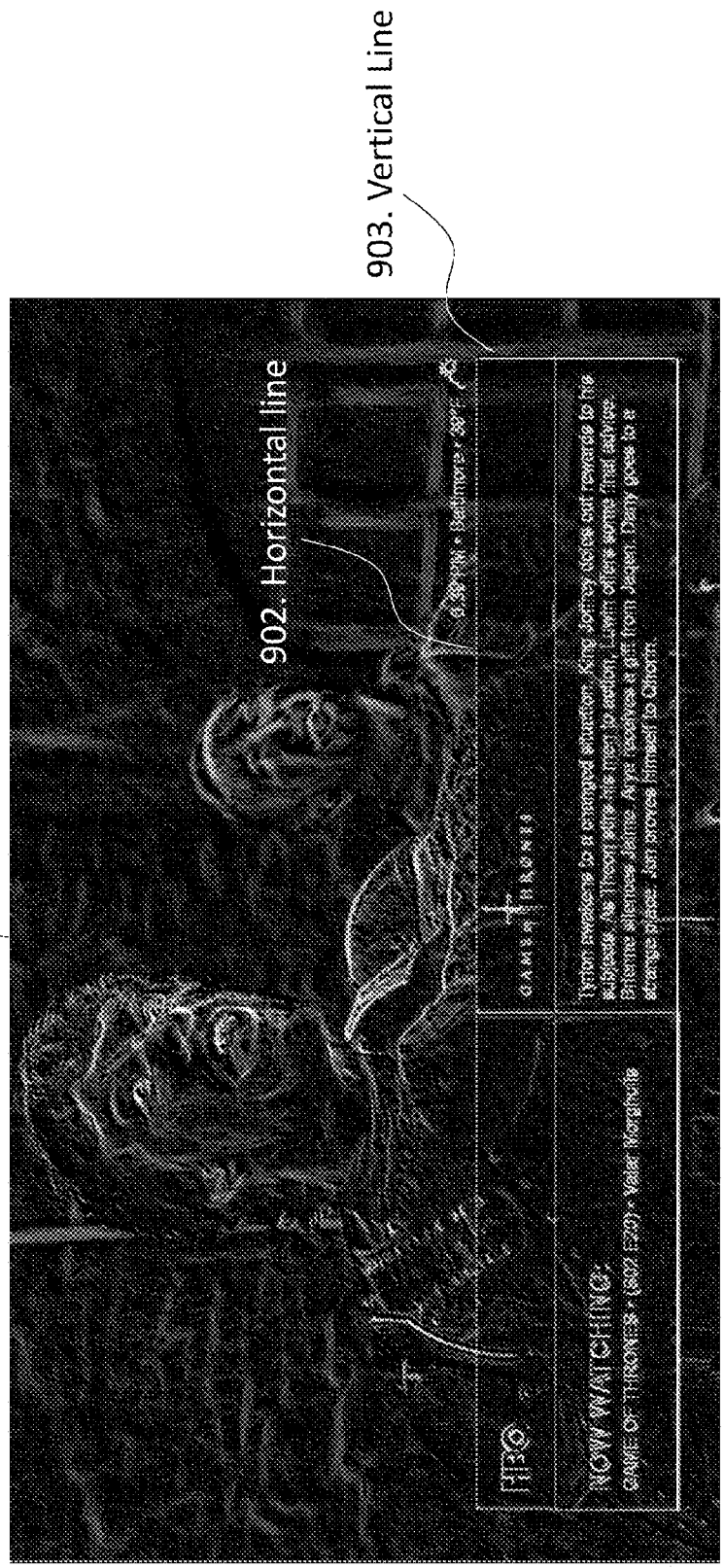
FIG. 9 shows an example video frame after processing with both filter equations for FIGS. 7 & 8 revealing horizontal & vertical edge boundaries.
Figure 11:
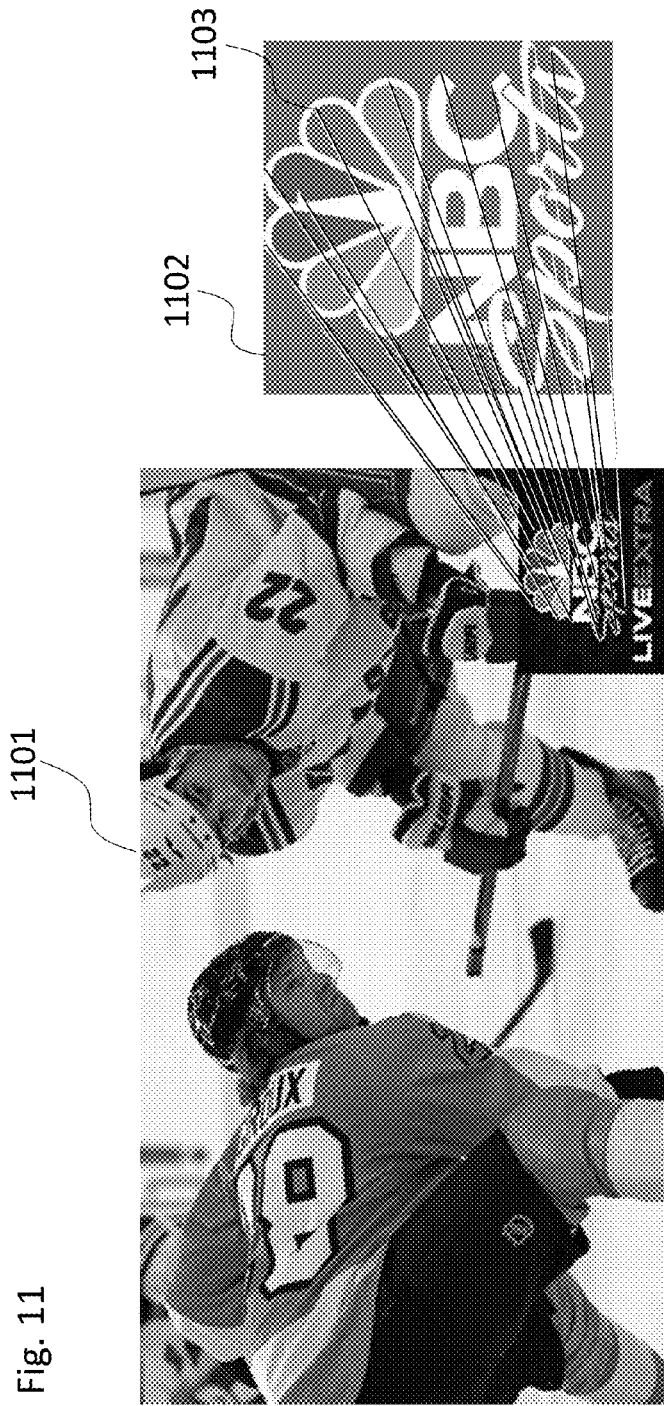
FIG. 11 illustrates sampling method searching for edges and distances between reference image of a typical television network logo and a logo found in the corner of a video frame.

The process begins with reducing the pixel information of an RGB value of 8 bits each (16 million colors) to an eight-bit monochrome value. Next, a Gaussian blur is applied to reduce noise in the video information. Next the pixel matrix, in this example 3 by 3, is passed over the video area of interest. This matrix calculated the first-order differential of the pixel values relative to either the vertical or horizontal axis of the video raster. The computed differential is left behind in the respective pixel locations which can then be easily examined for maximum values indicating edges as seen in FIG. 8.

Another means of detecting graphics overlays is by "training" the system of the invention with the image of one or more graphics overlay to be detected using an image matching algorithmic approach such as perceptual hash (pHash), a public domain algorithm well known to those skilled in the art. Other video frame comparison algorithm might include the Scale-invariant feature transform (SIFT) or Speeded Up Robust Features (SURF) both of which are also well known to one skilled in the art.

Assuming the use of pHash, entire video frames are quickly processed by the pHash algorithm and the resulting hash values are may be compared to the reference video images, also processed by pHash means but supplied from the central server means of the invention via the data communications link with the application process of the invention resident in the television system. One of the advantages of using pHash is its ability to reliably match coarse features such as large rectangles or other shapes of graphic overlays with relatively high insensitivity to contrast, brightness or color changes. Another advantage is its ability to also match detailed individual video frames.

A further improvement of the invention would be to maintain an appropriately sized library of different possible graphics overlay comparison candidates while still reducing the number of total image searches per unit of time. This is done based on past successful detections such that the most probably graphics overlays are tested more frequently than overlays that have yet to be detected. The process of detecting graphics overlay presence need only be applied at a rate less than that of the first invention [to which this is a CIP] and, regardless of the means described above, the graphics overlay detection process can easily be interleaved in the television application process with the normal automated content recognition processes of the first invention.

In FIG. 3, pixel patches 11, 12, 13, 16, 17 & 18 are used for edge detection using the discrete cosine transform (DCT) instead of being applied to the normal search means of the invention (as described in the main patent application.) FIG. 4 illustrates a similar pattern for overlay detection for large overlays such as electronic program guides. In this figure, pixel patch 1, 2, 3, 16, 17 & 18 may be all that need to be tested for accurate overlay detection.

There are a variety of considerations that determine how to detect a patch pattern. Logo detection, speed of detection, accuracy of detection, channel banners, HD content, SD content, FIG. 5. This invention uses pixel pattern detection in known areas of a television display raster to find matches to television broadcast logos to identify program channels. As with the previously defined graphics overlay detection, the invention might employ perceptual hashing algorithms where pHash processed reference images of all television logos of interest are supplied by the central server means of the invention to the television application of the invention. Said television application then periodically tests the video raster for matches of logos or other graphics elements of interest by continuously cycling through the library of supplied reference images from the central server. This process is periodically performed and interspersed with said applications normal duties of harvesting pixel patches for the primary automated content recognition function of the invention.

FIG. 5 illustrates a further aspect of the invention using pixel patches 1, 6, 11, 16 of the left column and 3, 8, 13, 18 of the right column to detect changing video only in the presence of HDTV picture information and hence can provide a means to detect standard definition television when said pixel patches detect unchanging video. Said process need on be performed on a reduced schedule from the normal video segment matching duties of the invention. A simple test of dark or solid color equally detected by the two columns of pixel patches would be sufficient to produce a reliable indication of display mode between standard and high-definition.

Core ingest system match process description
  1. Incoming video goes into TV Program DB
  2. Incoming video is tested against TV Ad DB
  3. If a match is found; TV ad segment is removed from TV Program DB
  4. Go back to step 1.
  5. Incoming video is tested against TV Program DB
  6. If a match is found; TV ad segment is removed from TV Program DB and placed in TV Ad DB
  7. Go back to step 1.
  Ad match process description
  1. Test incoming video with normal threshold (of U.S. Pat. No. 8,585,781) illustrated in 104 of FIG. 1 and segment is of length of interest (e.g. −5 seconds to 120 seconds)
  2. If match, then retest at high threshold, illustrated in 105 of FIG. 1
  3. If match, then retest at loose threshold but tight time tolerance FIG. 13 illustrates an operational flow 1300 representing example operations related to on-screen graphics detection. In FIG. 13 and in following figures that include various examples of operational flows, discussion and explanation may be provided with respect to the above-described examples of FIGS. 1 through 12, and/or with respect to other examples and contexts. However, it should be understood that the operational flows may be executed in a number of other environments and contexts, and/or in modified versions of FIGS. 1 through 12. Also, although the various operational flows are presented in the sequence(s) illustrated, it should be understood that the various operations may be performed in other orders than those which are illustrated, or may be performed concurrently.

After a start operation, the operational flow 1300 moves to operation 1302. Operation 1302 depicts detecting one or more graphics superimposed over a content rendered on a display of a television. For example, as shown in and/or described with respect to FIGS. 1 through 12.

Then, operation 1304 depicts providing at least some data associated with the detected one or more graphics to at least one content recognition operation configured for at least determining one or more identifiers associated with the content being rendered. For example, as shown in and/or described with respect to FIGS. 1 through 12.

FIG. 14 illustrates alternative embodiments of the example operational flow 1300 of FIG. 13. FIG. 14 illustrates an example embodiment where operation 1302 may include at least one additional operation. Additional operations may include operation 1402, operation 1404, and/or operation 1406.

Operation 1402 illustrates detecting at least one graphic superimposed over the content by at least one of control logic associated with the television, an external device operatively coupled with the television, an original broadcaster of the content, or at least one of a local broadcast or cable TV operator retransmitting the content. For example, as shown in and/or described with respect to FIGS. 1 through 12.

Further, operation 1404 illustrates detecting one or more at least partially opaque graphics superimposed over a content rendered on a display of a television. For example, as shown in and/or described with respect to FIGS. 1 through 12.

Further, operation 1406 illustrates detecting one or more of at least one banner superimposed over a content, at least one watermark superimposed over a content, at least one logo superimposed over a content, or at least one identifier related to a content rendered in at least one of HDTV or SDTV. For example, as shown in and/or described with respect to FIGS. 1 through 12.

Figure 15:
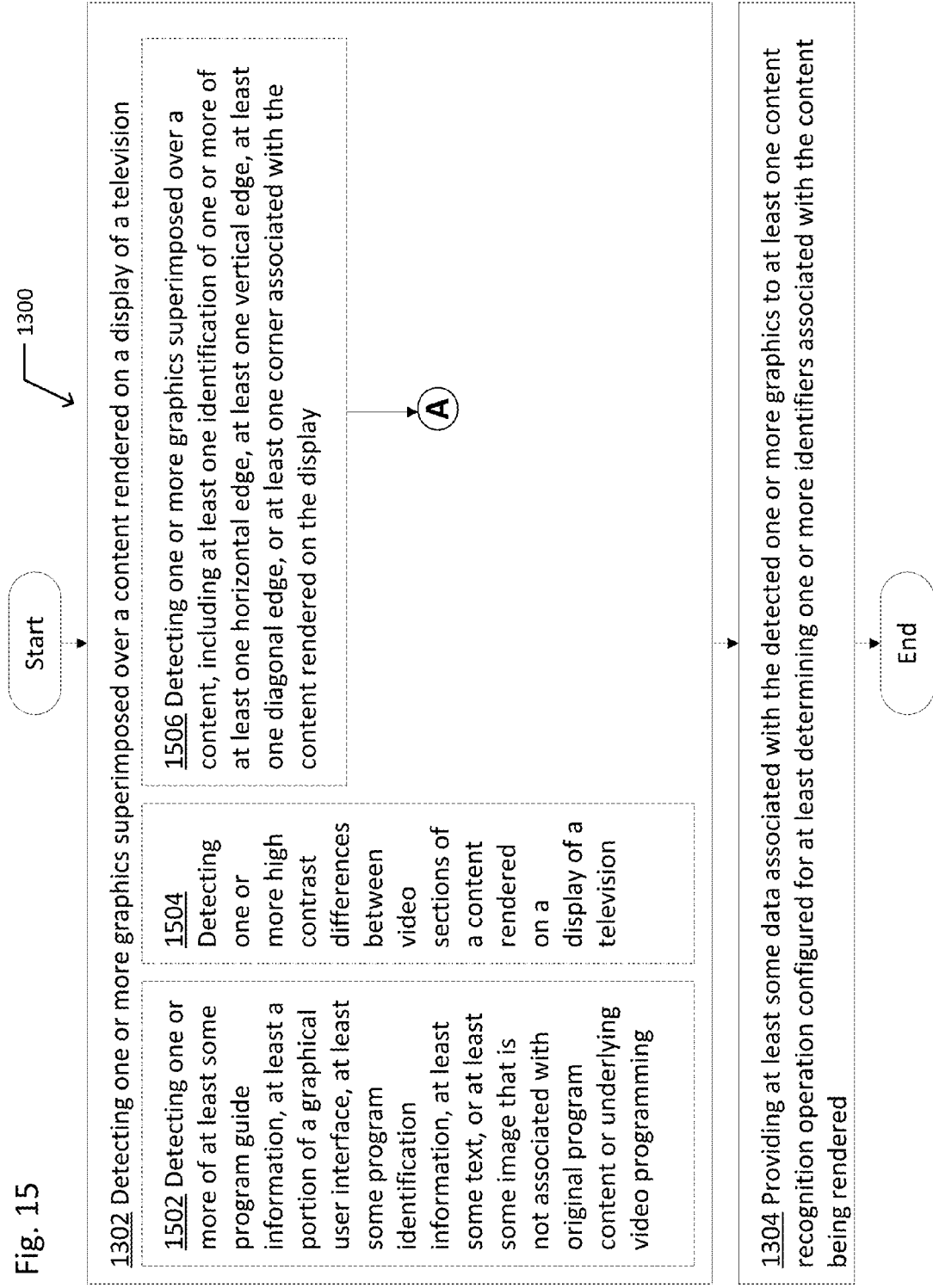
FIG. 15 illustrates an alternative embodiment of the operational flow of FIG. 13.

FIG. 15 illustrates alternative embodiments of the example operational flow 1300 of FIG. 13. FIG. 15 illustrates an example embodiment where operation 1302 may include at least one additional operation. Additional operations may include operation 1502, operation 1504, and/or operation 1506.

Operation 1502 illustrates detecting one or more of at least some program guide information, at least a portion of a graphical user interface, at least some program identification information, at least some text, or at least some image that is not associated with original program content or underlying video programming. For example, as shown in and/or described with respect to FIGS. 1 through 12.

Further, operation 1504 illustrates detecting one or more high contrast differences between video sections of a content rendered on a display of a television. For example, as shown in and/or described with respect to FIGS. 1 through 12.

Further, operation 1506 illustrates detecting one or more graphics superimposed over a content, including at least one identification of one or more of at least one horizontal edge, at least one vertical edge, at least one diagonal edge, or at least one corner associated with the content rendered on the display. For example, as shown in and/or described with respect to FIGS. 1 through 12.

Figure 16:
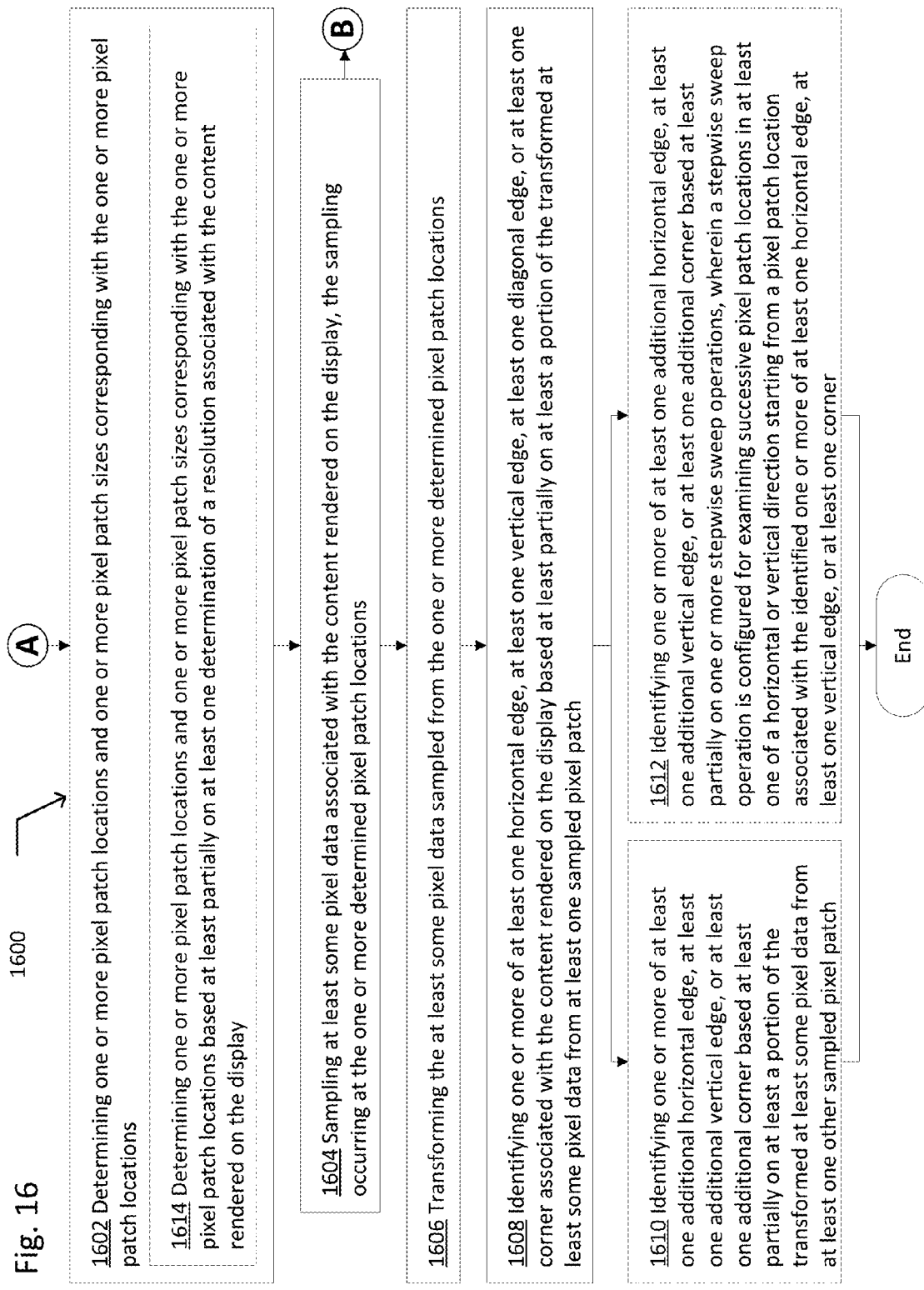
FIG. 16 illustrates an alternative embodiment of the operational flow of FIG. 13.

FIG. 16 illustrates alternate embodiments of the example operational flow 1300 of FIG. 13. FIG. 16 illustrates an example embodiment where operation 1506 may include at least one additional operation. Additional operations may include operation 1602, 1604, 1606, 1608, 1610, 1612, and/or 1614.

Operation 1602 illustrates determining one or more pixel patch locations and one or more pixel patch sizes corresponding with the one or more pixel patch locations. For example, as shown in and/or described with respect to FIGS. 1 through 12.

Operation 1604 illustrates sampling at least some pixel data associated with the content rendered on the display, the sampling occurring at the one or more determined pixel patch locations. For example, as shown in and/or described with respect to FIGS. 1 through 12.

Operation 1606 illustrates transforming the at least some pixel data sampled from the one or more determined pixel patch locations. For example, as shown in and/or described with respect to FIGS. 1 through 12.

Operation 1608 illustrates identifying one or more of at least one horizontal edge, at least one vertical edge, at least one diagonal edge, or at least one corner associated with the content rendered on the display based at least partially on at least a portion of the transformed at least some pixel data from at least one sampled pixel patch. For example, as shown in and/or described with respect to FIGS. 1 through 12.

Operation 1610 illustrates identifying one or more of at least one additional horizontal edge, at least one additional vertical edge, or at least one additional corner based at least partially on at least a portion of the transformed at least some pixel data from at least one other sampled pixel patch. For example, as shown in and/or described with respect to FIGS. 1 through 12.

Operation 1612 illustrates identifying one or more of at least one additional horizontal edge, at least one additional vertical edge, or at least one additional corner based at least partially on one or more stepwise sweep operations, wherein a stepwise sweep operation is configured for examining successive pixel patch locations in at least one of a horizontal or vertical direction starting from a pixel patch location associated with the identified one or more of at least one horizontal edge, at least one vertical edge, or at least one corner. For example, as shown in and/or described with respect to FIGS. 1 through 12.

Operation 1614 illustrates determining one or more pixel patch locations and one or more pixel patch sizes corresponding with the one or more pixel patch locations based at least partially on at least one determination of a resolution associated with the content rendered on the display. For example, as shown in and/or described with respect to FIGS. 1 through 12.

FIG. 17 illustrates alternate embodiments of the example operational flow 1300 of FIG. 13. FIG. 17 illustrates an example embodiment where operation 1604 may include at least one additional operation. Additional operations may include operation 1702, 1704, 1706, 1708, and/or 1710.

Operation 1702 illustrates storing the content rendered on the display in one or more buffers. For example, as shown in and/or described with respect to FIGS. 1 through 12.

Operation 1704 illustrates removing color data associated with the content from the one or more buffers. For example, as shown in and/or described with respect to FIGS. 1 through 12.

Operation 1706 illustrates performing at least one Gaussian blur operation on the data in the one or more buffers. For example, as shown in and/or described with respect to FIGS. 1 through 12.

Operation 1708 illustrates transforming data associated with the one or more pixel patch locations and the one or more buffers to identify one or more high-contrast regions of pixel patches, the one or more high-contrast regions at least partially determinative of one or more of at least one horizontal edge, at least one vertical edge, at least one diagonal edge, or at least one corner associated with the content rendered on the display. For example, as shown in and/or described with respect to FIGS. 1 through 12.

Operation 1710 illustrates transforming data associated with the one or more pixel patch locations and the one or more buffers using at least one of a discrete cosine transform, a Sobel algorithm, a Sharr algorithm, or another algorithm operable to identify one or more high-contrast regions of pixel patches. For example, as shown in and/or described with respect to FIGS. 1 through 12.

Figure 18:
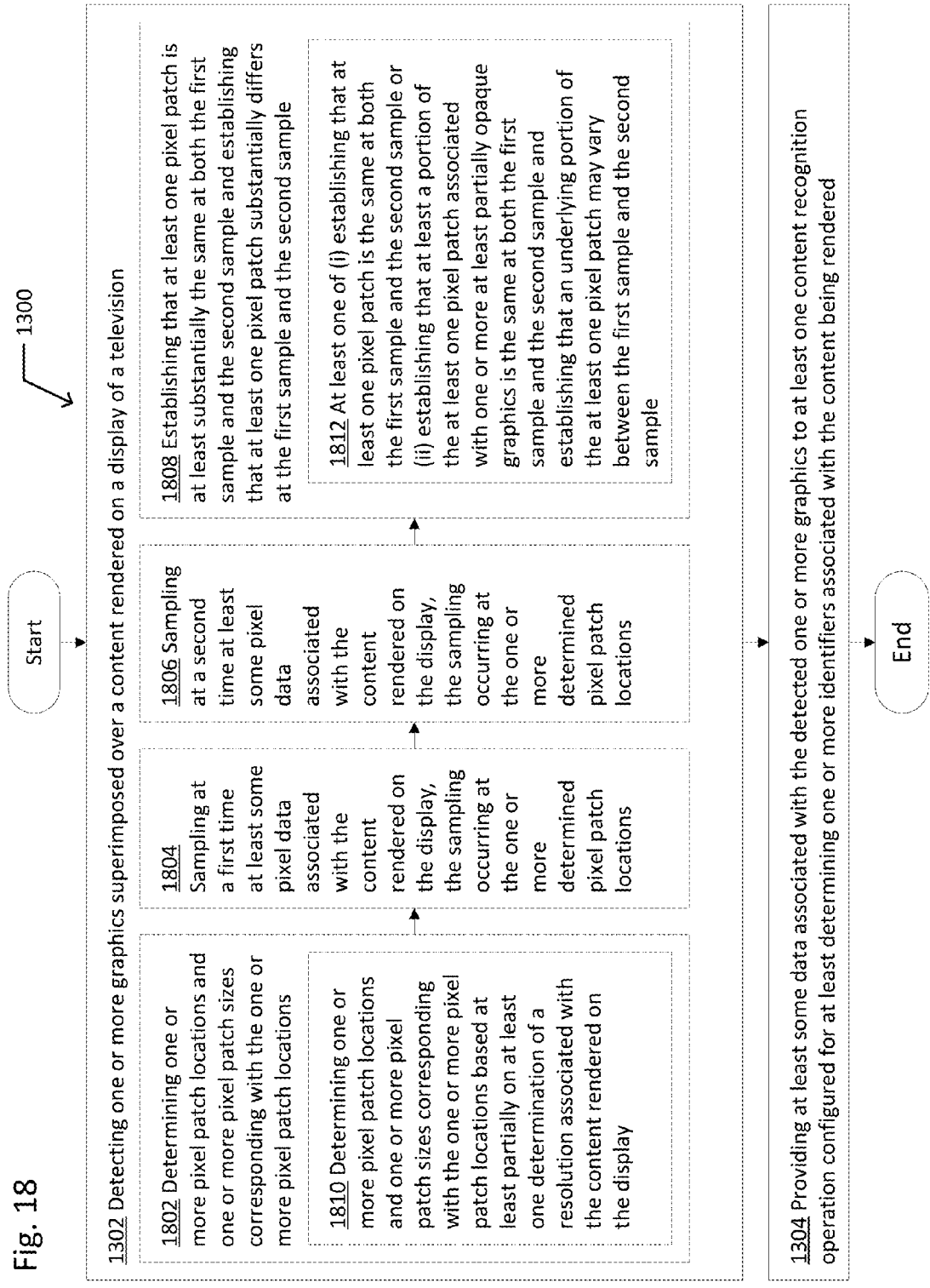
FIG. 18 illustrates an alternative embodiment of the operational flow of FIG. 13.

FIG. 18 illustrates alternate embodiments of the example operational flow 1300 of FIG. 13. FIG. 18 illustrates an example embodiment where operation 1302 may include at least one additional operation. Additional operations may include operation 1802, 1804, 1806, 1808, 1810, and/or 1812.

Operation 1802 illustrates determining one or more pixel patch locations and one or more pixel patch sizes corresponding with the one or more pixel patch locations. For example, as shown in and/or described with respect to FIGS. 1 through 12.

Operation 1804 illustrates sampling at a first time at least some pixel data associated with the content rendered on the display, the sampling occurring at the one or more determined pixel patch locations. For example, as shown in and/or described with respect to FIGS. 1 through 12.

Operation 1806 illustrates sampling at a second time at least some pixel data associated with the content rendered on the display, the sampling occurring at the one or more determined pixel patch locations. For example, as shown in and/or described with respect to FIGS. 1 through 12.

Operation 1808 illustrates establishing that at least one pixel patch is at least substantially the same at both the first sample and the second sample and establishing that at least one pixel patch substantially differs at the first sample and the second sample. For example, as shown in and/or described with respect to FIGS. 1 through 12.

Operation 1810 illustrates determining one or more pixel patch locations and one or more pixel patch sizes corresponding with the one or more pixel patch locations based at least partially on at least one determination of a resolution associated with the content rendered on the display. For example, as shown in and/or described with respect to FIGS. 1 through 12.

Operation 1812 illustrates at least one of (i) establishing that at least one pixel patch is the same at both the first sample and the second sample or (ii) establishing that at least a portion of the at least one pixel patch associated with one or more at least partially opaque graphics is the same at both the first sample and the second sample and establishing that an underlying portion of the at least one pixel patch may vary between the first sample and the second sample. For example, as shown in and/or described with respect to FIGS. 1 through 12.

Figure 19:
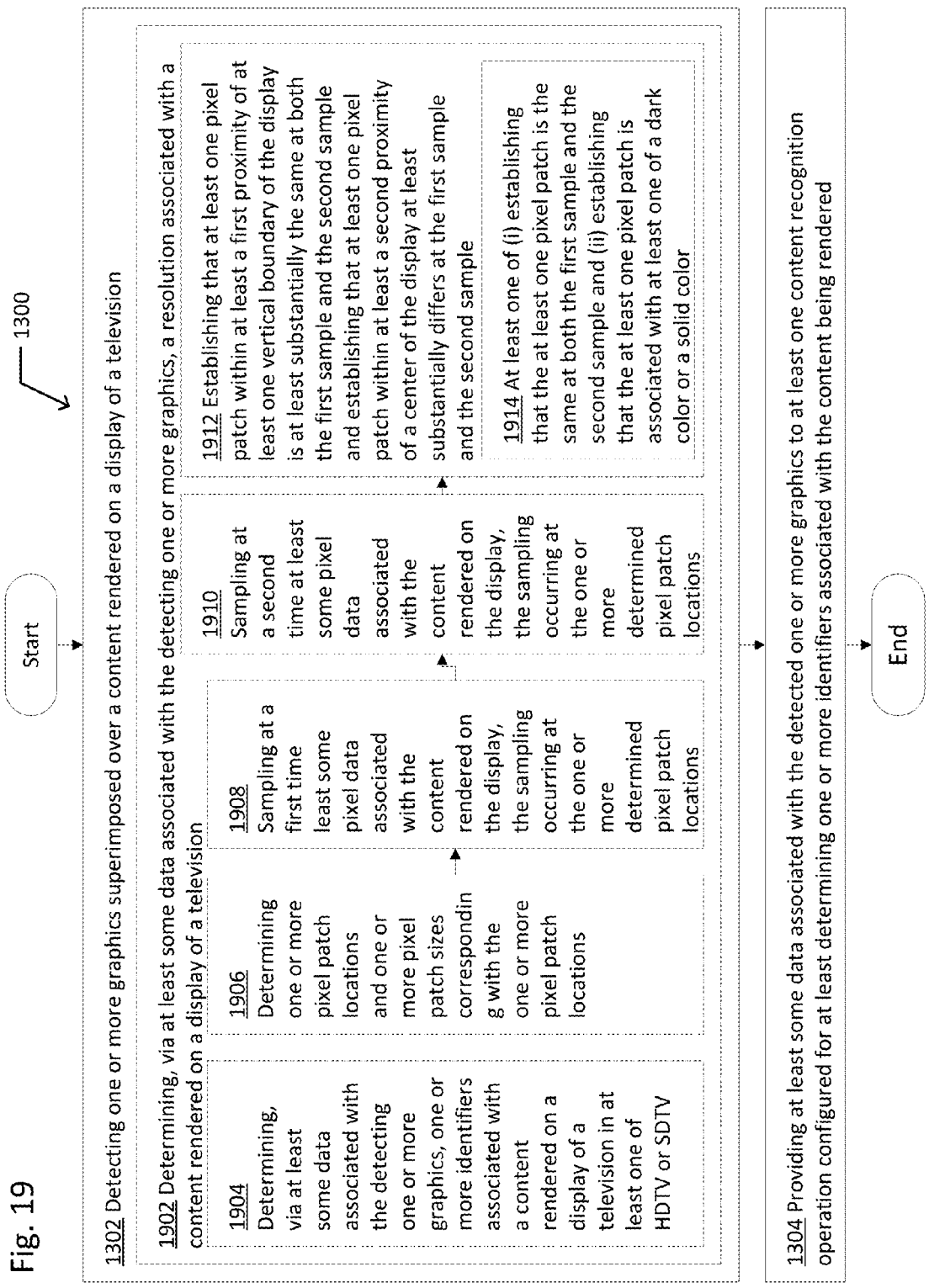
FIG. 19 illustrates an alternative embodiment of the operational flow of FIG. 13.

FIG. 19 illustrates alternate embodiments of the example operational flow 1300 of FIG. 13. FIG. 19 illustrates an example embodiment where operation 1302 may include at least one additional operation. Additional operations may include operation 1902, 1904, 1906, 1908, 1910, 1912 and/or 1914.

Operation 1902 illustrates determining, via at least some data associated with the detecting one or more graphics, a resolution associated with a content rendered on a display of a television. For example, as shown in and/or described with respect to FIGS. 1 through 12.

Operation 1904 illustrates determining, via at least some data associated with the detecting one or more graphics, one or more identifiers associated with a content rendered on a display of a television in at least one of HDTV or SDTV. For example, as shown in and/or described with respect to FIGS. 1 through 12.

Operation 1906 illustrates determining one or more pixel patch locations and one or more pixel patch sizes corresponding with the one or more pixel patch locations. For example, as shown in and/or described with respect to FIGS. 1 through 12.

Operation 1908 illustrates sampling at a first time least some pixel data associated with the content rendered on the display, the sampling occurring at the one or more determined pixel patch locations. For example, as shown in and/or described with respect to FIGS. 1 through 12.

Operation 1910 illustrates sampling at a second time at least some pixel data associated with the content rendered on the display, the sampling occurring at the one or more determined pixel patch locations. For example, as shown in and/or described with respect to FIGS. 1 through 12.

Operation 1912 illustrates establishing that at least one pixel patch within at least a first proximity of at least one vertical boundary of the display is at least substantially the same at both the first sample and the second sample and establishing that at least one pixel patch within at least a second proximity of a center of the display at least substantially differs at the first sample and the second sample. For example, as shown in and/or described with respect to FIGS. 1 through 12.

Operation 1914 illustrates at least one of (i) establishing that the at least one pixel patch is the same at both the first sample and the second sample and (ii) establishing that the at least one pixel patch is associated with at least one of a dark color or a solid color. For example, as shown in and/or described with respect to FIGS. 1 through 12.

Figure 20:
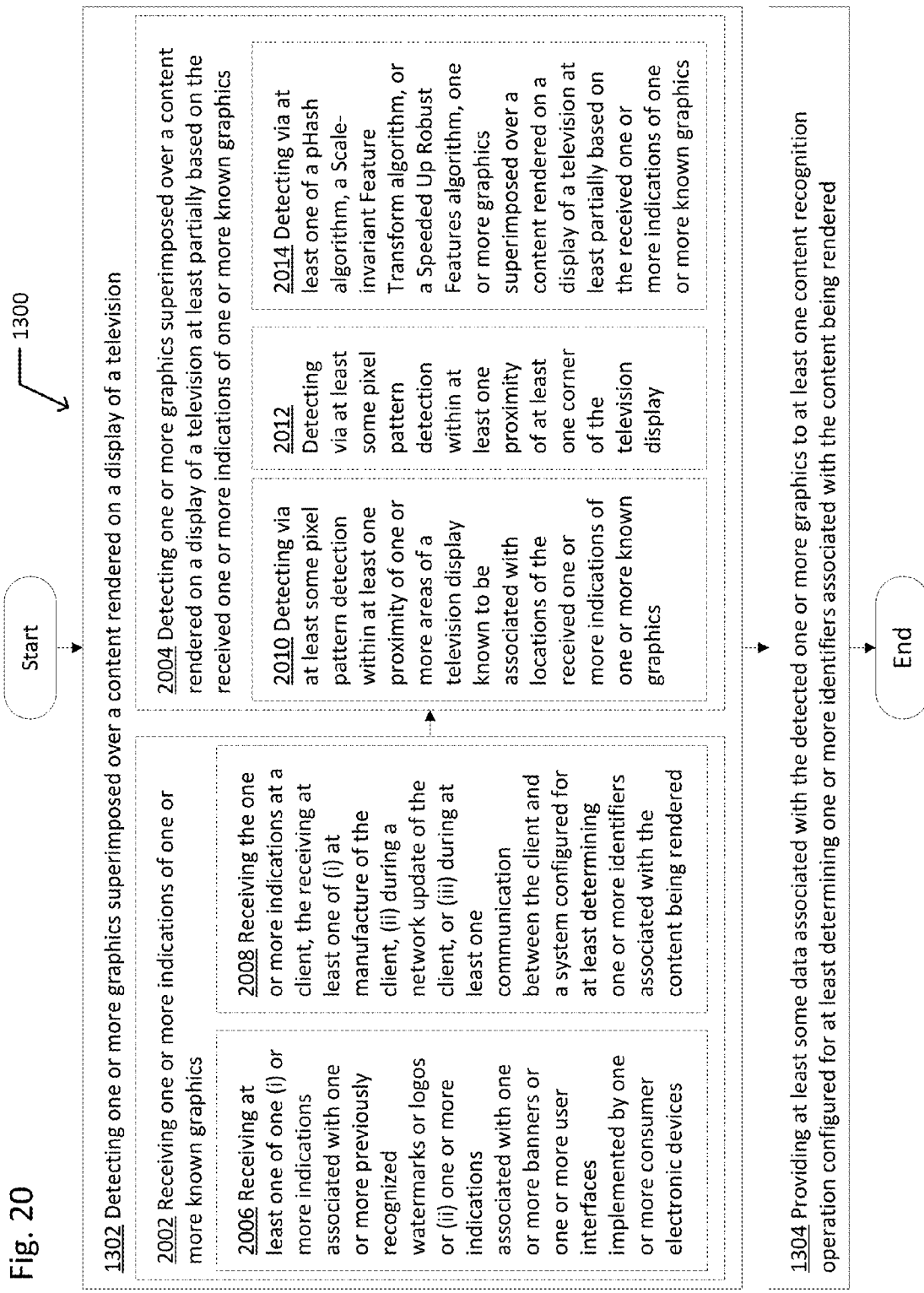
FIG. 20 illustrates an alternative embodiment of the operational flow of FIG. 13.

FIG. 20 illustrates alternate embodiments of the example operational flow 1300 of FIG. 13. FIG. 20 illustrates an example embodiment where operation 1302 may include at least one additional operation. Additional operations may include operation 2002, 2004, 2006, 2008, 2010, 2012 and/or 2014.

Operation 2002 illustrates receiving one or more indications of one or more known graphics. For example, as shown in and/or described with respect to FIGS. 1 through 12.

Operation 2004 illustrates detecting one or more graphics superimposed over a content rendered on a display of a television at least partially based on the received one or more indications of one or more known graphics. For example, as shown in and/or described with respect to FIGS. 1 through 12.

Operation 2006 illustrates receiving at least one of one (i) or more indications associated with one or more previously recognized watermarks or logos or (ii) one or more indications associated with one or more banners or one or more user interfaces implemented by one or more consumer electronic devices. For example, as shown in and/or described with respect to FIGS. 1 through 12.

Operation 2008 illustrates receiving the one or more indications at a client, the receiving at least one of (i) at manufacture of the client, (ii) during a network update of the client, or (iii) during at least one communication between the client and a system configured for at least determining one or more identifiers associated with the content being rendered. For example, as shown in and/or described with respect to FIGS. 1 through 12.

Operation 2010 illustrates detecting via at least some pixel pattern detection within at least one proximity of one or more areas of a television display known to be associated with locations of the received one or more indications of one or more known graphics. For example, as shown in and/or described with respect to FIGS. 1 through 12.

Operation 2012 illustrates detecting via at least some pixel pattern detection within at least one proximity of at least one corner of the television display. For example, as shown in and/or described with respect to FIGS. 1 through 12.

Operation 2014 illustrates detecting via at least one of a pHash algorithm, a Scale-invariant Feature Transform algorithm, or a Speeded Up Robust Features algorithm, one or more graphics superimposed over a content rendered on a display of a television at least partially based on the received one or more indications of one or more known graphics. For example, as shown in and/or described with respect to FIGS. 1 through 12.

FIG. 21 illustrates alternate embodiments of the example operational flow 1300 of FIG. 13. FIG. 21 illustrates an example embodiment where operation 2004 may include at least one additional operation, which may include operation 2102.

Operation 2102 illustrates detecting one or more graphics superimposed over a content rendered on a display of a television at least partially based on the received one or more indications of one or more known graphics and based at least partially on at least one determination of a resolution associated with the content rendered on the display. For example, as shown in and/or described with respect to FIGS. 1 through 12.

FIG. 22 illustrates alternate embodiments of the example operational flow 1300 of FIG. 13. FIG. 22 illustrates an example embodiment where operation 1302 may include at least one additional operation. Additional operations may include operation 2202, and/or 2204. Further, operation 1304 may include at least one additional operation. Additional operations may include operation 2206, and/or 2208.

Operation 2202 illustrates detecting one or more graphics superimposed over a content rendered on a display of a television at least one of as a part of a content recognition operation or following a previous content recognition operation. For example, as shown in and/or described with respect to FIGS. 1 through 12.

Operation 2204 illustrates detecting, by at least one of a widget of a smart television or a widget of a consumer device coupled with a television, one or more graphics superimposed over a rendered content. For example, as shown in and/or described with respect to FIGS. 1 through 12.

Operation 2206 illustrates modifying at least one of one or more cues or one or more fingerprints operable to at least partially identify content being rendered, the modifying based at least partially on detecting one or more graphics superimposed over a content rendered on a display of a television. For example, as shown in and/or described with respect to FIGS. 1 through 12.

Operation 2208 illustrates providing at least some data operable to associate at least one of a "no match" result or an "on-screen graphic interference" notification with at least some cue or fingerprint data based at least partially on the detected one or more graphics. For example, as shown in and/or described with respect to FIGS. 1 through 12.

FIG. 23 illustrates alternate embodiments of the example operational flow 1300 of FIG. 13. FIG. 23 illustrates an example embodiment where operation 1304 may include at least one additional operation. Additional operations may include operation 2302, and/or 2304.

Operation 2302 illustrates providing one or more indications related to at least one of halting or resuming at least one process related to automated content recognition based at least partially on at least one of a detection of one or more graphics superimposed over a content rendered on a display of a television or a detection of no graphics superimposed over a content rendered on a display of a television. For example, as shown in and/or described with respect to FIGS. 1 through 12.

Operation 2304 illustrates providing the one or more indications to at least one of a television, a client system operably coupled with a television, or a central system configured for at least determining one or more identifiers associated with content being rendered on a plurality of clients. For example, as shown in and/or described with respect to FIGS. 1 through 12.

FIG. 24 illustrates alternate embodiments of the example operational flow 1300 of FIG. 13. FIG. 24 illustrates an example embodiment where operation 2206 may include at least one additional operation. Additional operations may include operation 2402, 2404, 2406, and/or 2408.

Operation 2402 illustrates providing at least some information related to at least one subset of pixel patches associated with an automated content recognition operation, the automated content recognition operation based at least partially on a predefined number of pixel patches. For example, as shown in and/or described with respect to FIGS. 1 through 12.

Operation 2404 illustrates sending at least one indication to at least one central system associated with the automated content recognition operation related to the at least one subset, the at least one indication operable to cause the automated content recognition operation to attempt to recognize the content being rendered based at least partially on the at least one subset of pixel patches. For example, as shown in and/or described with respect to FIGS. 1 through 12.

Operation 2406 illustrates providing at least some information related to at least one alternate set of pixel patches associated with an automated content recognition operation, the automated content recognition operation based at least partially on at least one predefined number of pixel patches, wherein the at least one alternate set of pixel patches is determined based at least partially on the detected one or more graphics. For example, as shown in and/or described with respect to FIGS. 1 through 12.

Operation 2408 illustrates sending at least one indication to at least one central system associated with the automated content recognition operation related to the at least one subset, the at least one indication operable to cause the automated content recognition operation to attempt to recognize the content being rendered based at least partially on the at least one alternate set of pixel patches. For example, as shown in and/or described with respect to FIGS. 1 through 12.

FIG. 25 illustrates an exemplary computer program product 2500 which may include at least one non-transitory computer-readable medium. Further illustrated in FIG. 25 are instructions 2502 of computer program product 2500. Instructions 2502 illustrate one or more instructions for detecting one or more graphics superimposed over a content rendered on a display of a television; and one or more instructions for providing at least some data associated with the detected one or more graphics to at least one content recognition operation configured for at least determining one or more identifiers associated with the content being rendered. For example, as shown in and/or described with respect to FIGS. 1 through 24, a computer program product may include one or more instructions encoded on and/or stored by one or more non-transitory computer-readable media. The one or more instructions may, when executed by one or more processing devices, cause the one or more processing devices to perform operations including detecting one or more graphics superimposed over a content rendered on a display of a television; and providing at least some data associated with the detected one or more graphics to at least one content recognition operation configured for at least determining one or more identifiers associated with the content being rendered.

The foregoing operations may be similar at least in part and/or be substantially similar to (but are not limited to) corresponding operations disclosed elsewhere herein.

FIG. 26 illustrates an exemplary system 2600. System 2600 may include circuitry 2602, circuitry 2604, and/or circuitry 2606.

Circuitry 2602 illustrates circuitry configured for detecting one or more graphics superimposed over a content rendered on a display of a television. For example, as shown in and/or described with respect to FIGS. 1 through 24, circuitry 2602 may cause operations with an effect similar at least in part and/or substantially similar to (but not limited to) corresponding operations disclosed elsewhere herein.

Then, circuitry 2604 illustrates circuitry configured for providing at least some data associated with one or more detected graphics to at least one content recognition operation configured for at least determining one or more identifiers associated with content being rendered. For example, as shown in and/or described with respect to FIGS. 1 through 24, circuitry 2604 may cause operations with an effect similar at least in part and/or substantially similar to (but not limited to) corresponding operations disclosed elsewhere herein.

The operations by which the video segment is determined may include operations described in a parent application, U.S. patent application Ser. No. 12/788,721 (now U.S. Pat. No. 8,595,781), "METHODS FOR IDENTIFYING VIDEO SEGMENTS AND DISPLAYING CONTEXTUAL TARGETED CONTENT ON A CONNECTED TELEVISION" ("the '781 patent") and/or in related U.S. patent application Ser. No. 14/217,039, "SYSTEMS AND METHODS FOR ADDRESSING A MEDIA DATABASE USING DISTANCE ASSOCIATIVE HASHING" filed concurrently with the instant application ("the related application"). perhaps via operations disclosed in the '781 patent and/or the related application.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    detecting, in a frame of video rendered on a display of a television, a video content, including at least detecting one or more graphics superimposed over a network broadcast of the video content; and
    transmitting, at least partially via the Internet, at least one indication receivable by at least one content recognition operation, the at least one indication transmitted in response to detecting the video content including at least the detected one or more graphics superimposed over the network broadcast of the video content, the transmitted at least one indication operable to associate at least one of a "no match" result or an "on-screen graphic interference" notification with one or more of at least some cue data or at least some fingerprint data related to video content being rendered on the display of the television.

2. The method of claim 1, wherein detecting, in a frame of video rendered on a display of a television, a video content, including at least detecting one or more graphics superimposed over a network broadcast of the video content comprises:
    detecting at least one graphic superimposed over the video content by at least one of control logic associated with the television, an external device operatively coupled with the television, or at least one of a local broadcaster, satellite TV operator, or cable TV operator retransmitting the content.

3. The method of claim 1, wherein detecting, in a frame of video rendered on a display of a television, a video content, including at least detecting one or more graphics superimposed over a network broadcast of the video content comprises:
    detecting one or more at least partially opaque graphics superimposed over the video content.

4. The method of claim 1, wherein detecting, in a frame of video rendered on a display of a television, a video content, including at least detecting one or more graphics superimposed over a network broadcast of the video content comprises:
    detecting one or more of at least one banner superimposed over the video content, at least one watermark superimposed over the video content, or at least one logo superimposed over the video content.

5. The method of claim 1, wherein detecting, in a frame of video rendered on a display of a television, a video content, including at least detecting one or more graphics superimposed over a network broadcast of the video content comprises:
    detecting one or more of at least some program guide information, at least a portion of a graphical user interface, at least some program identification information, at least some text, or at least some image that is not associated with original program content or underlying video programming.

6. The method of claim 1, wherein detecting, in a frame of video rendered on a display of a television, a video content, including at least detecting one or more graphics superimposed over a network broadcast of the video content comprises:
    detecting one or more high contrast differences between sections of the video content.

7. The method of claim 1, wherein detecting, in a frame of video rendered on a display of a television, a video content, including at least detecting one or more graphics superimposed over a network broadcast of the video content comprises:
    detecting the video content including one or more graphics superimposed over the video content, including at least one identification of one or more of at least one horizontal edge, at least one vertical edge, at least one diagonal edge, or at least one corner associated with the video content.

8. The method of claim 7, wherein detecting the video content including one or more graphics superimposed over the video content, including at least one identification of one or more of at least one horizontal edge, at least one vertical edge, at least one diagonal edge, or at least one corner associated with the video content comprises:
    determining one or more pixel patch locations and one or more pixel patch sizes corresponding with the one or more pixel patch locations;
    sampling at least some pixel data associated with the video content, the sampling occurring at the one or more determined pixel patch locations;
    transforming the at least some pixel data sampled from the one or more determined pixel patch locations; and
    identifying one or more of at least one horizontal edge, at least one vertical edge, at least one diagonal edge, or at least one corner associated with the video content based at least partially on at least a portion of the transformed at least some pixel data from at least one sampled pixel patch.

9. The method of claim 8, wherein sampling at least some pixel data associated with the video content, the sampling occurring at the one or more determined pixel patch locations comprise:
    storing at least one frame of the video content in one or more buffers;
    removing color data associated with the video content from the one or more buffers;

performing at least one Gaussian blur operation on the data in the one or more buffers; and transforming data associated with the one or more pixel patch locations and the one or more buffers to identify one or more high-contrast regions of pixel patches, the one or more high-contrast regions at least partially determinative of one or more of at least one horizontal edge, at least one vertical edge, at least one diagonal edge, or at least one corner associated with the video content.

10. The method of claim 9, wherein transforming data associated with the one or more pixel patch locations and the one or more buffers to identify one or more high-contrast regions of pixel patches, the one or more high-contrast regions at least partially determinative of one or more of at least one horizontal edge, at least one vertical edge, at least one diagonal edge, or at least one corner associated with the video content comprises:

transforming data associated with the one or more pixel patch locations and the one or more buffers using at least one of a discrete cosine transform, a Sobel algorithm, a Sharr algorithm, or another algorithm operable to identify one or more high-contrast regions of pixel patches.

11. The method of claim 8, further comprising:

identifying one or more of at least one additional horizontal edge, at least one additional vertical edge, or at least one additional corner based at least partially on at least a portion of the transformed at least some pixel data from at least one other sampled pixel patch.

12. The method of claim 8, further comprising:

identifying one or more of at least one additional horizontal edge, at least one additional vertical edge, or at least one additional corner based at least partially on one or more stepwise sweep operations, wherein a stepwise sweep operation is configured for examining successive pixel patch locations in at least one of a horizontal or vertical direction starting from a pixel patch location associated with the identified one or more of at least one horizontal edge, at least one vertical edge, or at least one corner.

13. The method of claim 8, wherein determining one or more pixel patch locations and one or more pixel patch sizes corresponding with the one or more pixel patch locations comprises:

determining one or more pixel patch locations and one or more pixel patch sizes corresponding with the one or more pixel patch locations based at least partially on at least one determination of at least one resolution associated with the video content.

14. The method of claim 1, wherein detecting, in a frame of video rendered on a display of a television, a video content, including at least detecting one or more graphics superimposed over a network broadcast of the video content comprises:

determining one or more pixel patch locations and one or more pixel patch sizes corresponding with the one or more pixel patch locations;

sampling at a first time at least some pixel data associated with the video content, the sampling occurring at the one or more determined pixel patch locations;

sampling at a second time at least some pixel data associated with the video content, the sampling occurring at the one or more determined pixel patch locations; and establishing that at least one pixel patch is at least substantially the same at both the first sample and the second sample and establishing that at least one pixel patch substantially differs at the first sample and the second sample.

15. The method of claim 14, wherein establishing that at least one pixel patch is at least substantially the same at both the first sample and the second sample comprises:

at least one of (i) establishing that at least one pixel patch is the same at both the first sample and the second sample or (ii) establishing that at least a portion of the at least one pixel patch associated with one or more at least partially opaque graphics is the same at both the first sample and the second sample and establishing that an underlying portion of the at least one pixel patch may vary between the first sample and the second sample.

16. The method of claim 14, wherein determining one or more pixel patch locations and one or more pixel patch sizes corresponding with the one or more pixel patch locations comprises:

determining one or more pixel patch locations and one or more pixel patch sizes corresponding with the one or more pixel patch locations based at least partially on at least one determination of at least one resolution associated with the video content.

17. The method of claim 1, wherein detecting, in a frame of video rendered on a display of a television, a video content, including at least detecting one or more graphics superimposed over a network broadcast of the video content comprises:

determining, via at least some data associated with the detecting a video content, at least one resolution associated with the video content.

18. The method of claim 17, wherein determining, via at least some data associated with the detecting a video content, at least one resolution associated with the video content comprises:

determining, via at least some data associated with the detecting a video content, one or more identifiers associated with the video content renderable in at least one of HDTV or SDTV.

19. The method of claim 1, wherein detecting, in a frame of video rendered on a display of a television, a video content, including at least detecting one or more graphics superimposed over a network broadcast of the video content comprises:

receiving one or more indications of one or more known graphics; and detecting one or more graphics superimposed over the video content at least partially based on the received one or more indications of one or more known graphics.

20. The method of claim 19, wherein receiving one or more indications of one or more known graphics comprises:

receiving at least one of one (i) or more indications associated with one or more previously recognized watermarks or logos or (ii) one or more indications associated with one or more banners or one or more user interfaces implemented by one or more consumer electronic devices.

21. The method of claim 19, wherein receiving one or more indications of one or more known graphics comprises:

receiving the one or more indications at a client, the receiving at least one of (i) at manufacture of the client, (ii) during a network update of the client, or (iii) during at least one communication between the client and a system configured for at least determining one or more identifiers associated with the content being rendered.

22. The method of claim 19, wherein detecting one or more graphics superimposed over the video content at least partially based on the received one or more indications of one or more known graphics comprises:

detecting via at least some pixel pattern detection within at least one proximity of one or more areas of a television display known to be associated with locations of the received one or more indications of one or more known graphics.

23. The method of claim 19, wherein detecting one or more graphics superimposed over the video content at least partially based on the received one or more indications of one or more known graphics comprises:
   detecting via at least some pixel pattern detection within at least one proximity of at least one corner of a television display.

24. The method of claim 19, wherein detecting one or more graphics superimposed over the video content at least partially based on the received one or more indications of one or more known graphics comprises:
   detecting one or more graphics superimposed over the video content at least partially based on the received one or more indications of one or more known graphics and based at least partially on at least one determination of at least one resolution associated with the content rendered on the display.

25. The method of claim 19, wherein detecting one or more graphics superimposed over the video content at least partially based on the received one or more indications of one or more known graphics comprises:
   detecting one or more graphics superimposed over the video content at least one of as a part of a content recognition operation or following a previous content recognition operation.

26. The method of claim 1, wherein detecting, in a frame of video rendered on a display of a television, a video content, including at least detecting one or more graphics superimposed over a network broadcast of the video content comprises:
   detecting, by at least one of a widget of a smart television or a widget of a consumer device coupled with a television, the one or more graphics superimposed over the video content.

27. The method of claim 1, wherein transmitting, at least partially via the Internet, at least one indication receivable by at least one content recognition operation, the at least one indication transmitted in response to detecting the video content including at least the detected one or more graphics superimposed over the network broadcast of the video content, the transmitted at least one indication operable to associate at least one of a "no match" result or an "on-screen graphic interference" notification with one or more of at least some cue data or at least some fingerprint data related to video content being rendered on the display of the television comprises:
   transmitting one or more indications related to at least one of halting or resuming at least one process related to automated content recognition based at least partially on at least one of a detection of one or more graphics superimposed over a video content rendered on a display of a television or a detection of no graphics superimposed over a video content rendered on a display of a television.

28. The method of claim 27, wherein transmitting one or more indications related to at least one of halting or resuming at least one automated content recognition process based at least partially on at least one of a detection of one or more graphics superimposed over a video content rendered on a display of a television or a detection of no graphics superimposed over a video content rendered on a display of a television comprises
   transmitting the one or more indications to a central system configured for at least determining one or more identifiers associated with content being rendered on a plurality of televisions.

29. The method of claim 1, wherein transmitting, at least partially via the Internet, at least one indication receivable by at least one content recognition operation, the at least one indication transmitted in response to detecting the video content including at least the detected one or more graphics superimposed over the network broadcast of the video content, the transmitted at least one indication operable to associate at least one of a "no match" result or an "on-screen graphic interference" notification with one or more of at least some cue data or at least some fingerprint data related to video content being rendered on the display of the television comprises:
   modifying at least one of one or more cues or one or more fingerprints operable to at least partially identify content being rendered, the modifying based at least partially on detecting the video content including at least the detected one or more graphics superimposed over the network broadcast of the video content.

30. The method of claim 29, wherein modifying at least one of one or more cues or one or more fingerprints operable to at least partially identify content being rendered, the modifying based at least partially on detecting the video content including at least the detected one or more graphics superimposed over the network broadcast of the video content comprises:
   determining at least some information related to at least one subset of pixel patches associated with an automated content recognition operation, the automated content recognition operation based at least partially on a predefined number of pixel patches; and
   transmitting at least one indication to at least one central system associated with the automated content recognition operation related to the at least one subset, the at least one indication operable to cause the automated content recognition operation to attempt to recognize the content being rendered based at least partially on the at least one subset of pixel patches.

31. The method of claim 29, wherein modifying at least one of one or more cues or one or more fingerprints operable to at least partially identify content being rendered, the modifying based at least partially on detecting the video content including at least the detected one or more graphics superimposed over the network broadcast of the video content comprises:
   determining at least some information related to at least one alternate set of pixel patches associated with an automated content recognition operation, the automated content recognition operation based at least partially on at least one predefined number of pixel patches, wherein the at least one alternate set of pixel patches is determined based at least partially on the detected video content including one or more graphics; and
   transmitting at least one indication to at least one central system associated with the automated content recognition operation related to the at least one subset, the at least one indication operable to cause the automated content recognition operation to attempt to recognize the content being rendered based at least partially on the at least one alternate set of pixel patches.

32. The method of claim 1, wherein transmitting, at least partially via the Internet, at least one indication receivable by at least one content recognition operation, the at least one indication transmitted in response to detecting the video content including at least the detected one or more graphics superimposed over the network broadcast of the video content, the transmitted at least one indication operable to associate at least one of a "no match" result or an "on-screen graphic interference" notification with one or more of at least some cue data or at least some fingerprint data related to video content being rendered on the display of the television comprises:

transmitting at least one indication of at least one detection of at least one video frame with one or more graphics superimposed over programming content associated with at least one video content being rendered on the display of the television.

33. The method of claim 1, further comprising:
providing a television including at least:
at least one display capable of rendering received network broadcasts;
at least one processing device;
at least one network connection; and
at least one non-transitory computer-readable medium including at least one or more instructions which, when executed on the at least one processing device, cause the at least one processing device to at least:
detect the video content including at least detecting the one or more graphics; and
transmit, via the at least one network connection, the at least one indication in response to detecting the video content including at least detecting the one or more graphics.

34. The method of claim 33, wherein at least some of the one or more instructions, when executed on the at least one processing device, cause the at least one processing device to at least:
transmit, at least partially via the Internet and via the at least one network connection, one or more of at least some fingerprint data, at least some cue data, or at least one indication of one or more pixels renderable by the at least one display, the transmitting occurring in at least one of real-time or near real-time, the transmitting enabling a content recognition operation to utilize data associated with receiving the transmission to identify, in at least one of real-time or near real-time, a program being rendered on the television.

35. The method of claim 1, wherein detecting, in a frame of video rendered on a display of a television, a video content, including at least detecting one or more graphics superimposed over a network broadcast of the video content comprises:
detecting, in a frame of video loaded into a display buffer at least one of prior to rendering the frame on the display, concurrent with rendering the frame on the display, or subsequent to rendering the frame on the display, a video content, including at least detecting one or more graphics superimposed over a network broadcast of the video content.

36. A computer program product, comprising:
at least one non-transitory computer-readable medium including at least:
one or more instructions for detecting, in a frame of video rendered on a display of a television, a video content, including at least detecting one or more graphics superimposed over a network broadcast of the video content; and
one or more instructions for transmitting, at least partially via the Internet, at least one indication receivable by at least one content recognition operation, the at least one indication transmitted in response to detecting the video content including at least the detected one or more graphics superimposed over the network broadcast in the superimposing operation occurring subsequent to the network broadcast of the video content, the transmitted at least one indication operable to associate at least one of a "no match" result or an "on-screen graphic interference" notification with one or more of at least some cue data or at least some fingerprint data related to video content being rendered on the display of the television.

37. A system, comprising:
circuitry configured for detecting, in a frame of video rendered on a display of a television, a video content, including at least detecting one or more graphics superimposed over a network broadcast of the video content; and
circuitry configured for transmitting, at least partially via the Internet, at least one indication receivable by at least one content recognition operation, the at least one indication transmitted in response to detecting the video content including at least the detected one or more graphics superimposed over the network broadcast, the transmitted at least one indication operable to associate at least one of a "no match" result or an "on-screen graphic interference" notification with one or more of at least some cue data or at least some fingerprint data related to video content being rendered on the display of the television.

38. The system of claim 37, wherein circuitry configured for detecting, in a frame of video rendered on a display of a television, a video content, including at least detecting one or more graphics superimposed over a network broadcast of the video content comprises:
circuitry configured for detecting at least one graphic superimposed over the video content by at least one of control logic associated with the television, an external device operatively coupled with the television, or at least one of a local broadcaster, satellite TV operator, or cable TV operator retransmitting the content.

39. The system of claim 37, wherein circuitry configured for detecting, in a frame of video rendered on a display of a television, a video content, including at least detecting one or more graphics superimposed over a network broadcast of the video content comprises:
circuitry configured for detecting one or more of at least some program guide information, at least a portion of a graphical user interface, at least some program identification information, at least some text, or at least some image that is not associated with original program content or underlying video programming.

40. The system of claim 37, wherein circuitry configured for transmitting, at least partially via the Internet, at least one indication receivable by at least one content recognition operation, the at least one indication transmitted in response to detecting the video content including at least the detected one or more graphics superimposed over the network broadcast of the video content, the transmitted at least one indication operable to associate at least one of a "no match" result or an "on-screen graphic interference" notification with one or more of at least some cue data or at least some fingerprint data related to video content being rendered on the display of the television comprises:
circuitry configured for transmitting at least one indication of at least one detection of at least one video frame with one or more graphics superimposed over programming content associated with at least one video content being rendered on the display of the television.

41. The system of claim 37, wherein circuitry configured for transmitting, at least partially via the Internet, at least one indication receivable by at least one content recognition operation, the at least one indication transmitted in response to detecting the video content including at least the detected one or more graphics superimposed over the network broadcast of the video content, the transmitted at least one indication operable to associate at least one of a "no match" result or an "on-screen graphic interference" notification with one or more of at least some cue data or at least some fingerprint data related to video content being rendered on the display of the television comprises:

circuitry configured for transmitting one or more indications related to at least one of halting or resuming at least one process related to automated content recognition based at least partially on at least one of a detection of one or more graphics superimposed over a video content rendered on a display of a television or a detection of no graphics superimposed over a video content rendered on a display of a television.

42. The system of claim 37, wherein the circuitry configured for detecting and the circuitry configured for transmitting are at least partially implemented using at least one processing device of the television or at least partially implemented using at least one processing device of a client device coupled with the television.

* * * * *